(12) United States Patent
Wertz et al.

(10) Patent No.: US 8,608,817 B2
(45) Date of Patent: Dec. 17, 2013

(54) MELTBLOWN FILTER MEDIUM

(75) Inventors: John A. Wertz, Hollis, NH (US); David Thomas Healey, Bellingham, MA (US); William S. Freeman, Roanoke, VA (US); John L. Manns, Franklin, MA (US); Mark Rowlands, Stratford-upon-Avon (GB)

(73) Assignee: Hollingsworth & Vose Company, East Walpole, MA (US)

( * ) Notice: Subject to any disclaimer, the term of this patent is extended or adjusted under 35 U.S.C. 154(b) by 200 days.

(21) Appl. No.: 12/266,892

(22) Filed: Nov. 7, 2008

(65) Prior Publication Data

US 2009/0120048 A1    May 14, 2009

Related U.S. Application Data

(60) Provisional application No. 60/986,642, filed on Nov. 9, 2007.

(51) Int. Cl.
*B01D 46/00* (2006.01)

(52) U.S. Cl.
USPC .............. 55/486; 55/521; 55/524; 55/527; 55/528; 95/286

(58) Field of Classification Search
USPC ........... 55/486, 487, 524, 527, 528, 521, 522, 55/382, 385.1–385.3, DIG. 2; 210/483–510.1; 128/205.27–206.19; 442/327–417; 95/273–287; 264/101–102; 96/4–14
See application file for complete search history.

(56) References Cited

U.S. PATENT DOCUMENTS

| | | |
|---|---|---|
| 4,622,259 A | 11/1986 | McAmish et al. |
| 4,925,601 A | 5/1990 | Vogt et al. |
| 5,108,827 A | 4/1992 | Gessner |
| 5,178,931 A | 1/1993 | Perkins et al. |
| 5,238,474 A | 8/1993 | Kahlbaugh et al. |
| 5,306,321 A | 4/1994 | Osendorf |
| 5,401,446 A | 3/1995 | Tsai et al. |
| 5,496,507 A | 3/1996 | Angadjivand et al. |
| 5,580,459 A | 12/1996 | Powers et al. |
| 5,620,785 A | 4/1997 | Watt et al. |
| 5,647,881 A | 7/1997 | Zhang et al. |
| 5,672,188 A | 9/1997 | Choi |
| 5,672,399 A | 9/1997 | Kahlbaugh et al. |
| 5,783,503 A | 7/1998 | Gillespie et al. |

(Continued)

FOREIGN PATENT DOCUMENTS

| | | |
|---|---|---|
| DE | 20 2005 007 503 U1 | 10/2006 |
| DE | 10 2005 055 607 B3 | 3/2007 |

(Continued)

OTHER PUBLICATIONS

International Search Report and Written Opinion for Application No. PCT/US2008/082759 mailed Aug. 4, 2009.

(Continued)

*Primary Examiner* — Duane Smith
*Assistant Examiner* — Thomas McKenzie
(74) *Attorney, Agent, or Firm* — Wolf, Greenfield & Sacks, P.C.

(57) ABSTRACT

Filter media, as well as related assemblies, systems and methods. Filter media may contain one or more layers formed of a meltblown material.

35 Claims, 5 Drawing Sheets

(56) References Cited

U.S. PATENT DOCUMENTS

| | | | |
|---|---|---|---|
| 5,785,725 A | 7/1998 | Cusick et al. | |
| 5,786,065 A | 7/1998 | Annis et al. | |
| 5,804,512 A | 9/1998 | Lickfield et al. | |
| 5,935,883 A | 8/1999 | Pike | |
| 5,955,174 A | 9/1999 | Wadsworth et al. | |
| 5,993,501 A | 11/1999 | Cusick et al. | |
| 6,113,784 A * | 9/2000 | Stoyell et al. | 210/493.2 |
| 6,123,752 A | 9/2000 | Wu et al. | |
| 6,171,369 B1 | 1/2001 | Schultink et al. | |
| 6,171,684 B1 | 1/2001 | Kahlbaugh et al. | |
| 6,193,773 B1 | 2/2001 | Schlor et al. | |
| 6,261,979 B1 | 7/2001 | Tanaka et al. | |
| 6,267,252 B1 | 7/2001 | Amsler | |
| 6,315,806 B1 | 11/2001 | Torobin et al. | |
| 6,372,004 B1 | 4/2002 | Schultink et al. | |
| 6,428,610 B1 | 8/2002 | Tsai et al. | |
| 6,554,881 B1 | 4/2003 | Healey | |
| 6,579,350 B2 | 6/2003 | Doherty | |
| 6,603,054 B2 | 8/2003 | Chen et al. | |
| 6,743,273 B2 | 6/2004 | Chung et al. | |
| 6,746,517 B2 | 6/2004 | Benson et al. | |
| 6,858,057 B2 | 2/2005 | Healey | |
| 6,872,311 B2 | 3/2005 | Koslow | |
| 6,924,028 B2 | 8/2005 | Chung et al. | |
| 6,936,554 B1 | 8/2005 | Singer et al. | |
| 6,955,775 B2 | 10/2005 | Chung et al. | |
| 6,986,804 B2 * | 1/2006 | Dominiak et al. | 95/90 |
| 7,008,465 B2 | 3/2006 | Graham et al. | |
| 7,070,640 B2 | 7/2006 | Chung et al. | |
| 7,137,510 B1 | 11/2006 | Klein et al. | |
| 7,144,533 B2 | 12/2006 | Koslow | |
| 7,179,317 B2 | 2/2007 | Chung et al. | |
| 7,235,122 B2 | 6/2007 | Bryner et al. | |
| 7,314,497 B2 | 1/2008 | Kahlbaugh et al. | |
| 7,316,723 B2 | 1/2008 | Chung et al. | |
| 7,318,852 B2 | 1/2008 | Chung et al. | |
| 7,390,760 B1 | 6/2008 | Chen et al. | |
| 7,597,773 B2 * | 10/2009 | Kume et al. | 156/205 |
| 7,645,312 B2 * | 1/2010 | Hamlin et al. | 55/498 |
| 7,918,913 B2 | 4/2011 | Kalayci et al. | |
| 2001/0035094 A1 * | 11/2001 | Takagaki et al. | 96/154 |
| 2002/0013112 A1 | 1/2002 | Bontaites, Jr. et al. | |
| 2002/0083837 A1 * | 7/2002 | Doherty | 96/66 |
| 2002/0193553 A1 | 12/2002 | Qin et al. | |
| 2003/0003834 A1 | 1/2003 | Berrigan et al. | |
| 2003/0106294 A1 | 6/2003 | Chung et al. | |
| 2003/0150199 A1 * | 8/2003 | Tanaka et al. | 55/486 |
| 2003/0168401 A1 | 9/2003 | Koslow | |
| 2003/0177909 A1 | 9/2003 | Koslow | |
| 2003/0196963 A1 | 10/2003 | Koslow | |
| 2003/0196964 A1 | 10/2003 | Koslow | |
| 2003/0201231 A1 | 10/2003 | Koslow | |
| 2003/0203696 A1 | 10/2003 | Healey | |
| 2003/0205529 A1 | 11/2003 | Koslow | |
| 2003/0205530 A1 | 11/2003 | Koslow | |
| 2003/0205531 A1 | 11/2003 | Koslow | |
| 2003/0211802 A1 | 11/2003 | Keck et al. | |
| 2003/0213750 A1 | 11/2003 | Koslow | |
| 2003/0220039 A1 | 11/2003 | Chen et al. | |
| 2004/0060268 A1 | 4/2004 | Chung et al. | |
| 2004/0060269 A1 | 4/2004 | Chung et al. | |
| 2004/0083695 A1 | 5/2004 | Schultink et al. | |
| 2004/0112023 A1 * | 6/2004 | Choi | 55/486 |
| 2004/0123572 A1 | 7/2004 | Chung et al. | |
| 2004/0163540 A1 | 8/2004 | Mori et al. | |
| 2004/0187454 A1 | 9/2004 | Chung et al. | |
| 2004/0211160 A1 | 10/2004 | Rammig et al. | |
| 2004/0226886 A1 * | 11/2004 | Hester et al. | 210/649 |
| 2004/0255783 A1 * | 12/2004 | Graham et al. | 96/69 |
| 2004/0266300 A1 | 12/2004 | Isele et al. | |
| 2005/0006303 A1 | 1/2005 | Sanders | |
| 2005/0079379 A1 | 4/2005 | Wadsworth et al. | |
| 2005/0109393 A1 | 5/2005 | Anderson | |
| 2005/0109554 A1 | 5/2005 | Ishikawa et al. | |
| 2005/0109557 A1 | 5/2005 | Dravet et al. | |
| 2005/0136292 A1 | 6/2005 | Mariani et al. | |
| 2005/0148261 A1 | 7/2005 | Close et al. | |
| 2005/0193696 A1 * | 9/2005 | Muller et al. | 55/486 |
| 2005/0217226 A1 * | 10/2005 | Sundet et al. | 55/521 |
| 2005/0240517 A1 | 10/2005 | Wolzenski et al. | |
| 2005/0241598 A1 | 11/2005 | Ezaki | |
| 2005/0250726 A1 | 11/2005 | Krieg et al. | |
| 2005/0266760 A1 | 12/2005 | Chhabra et al. | |
| 2006/0096260 A1 | 5/2006 | Bryner et al. | |
| 2006/0096932 A1 | 5/2006 | Dema et al. | |
| 2006/0137317 A1 | 6/2006 | Bryner et al. | |
| 2006/0137318 A1 | 6/2006 | Lim et al. | |
| 2006/0292947 A1 | 12/2006 | LaVietes et al. | |
| 2007/0021021 A1 | 1/2007 | Verdegan et al. | |
| 2007/0054579 A1 | 3/2007 | Baker et al. | |
| 2007/0074628 A1 | 4/2007 | Jones et al. | |
| 2007/0075015 A1 | 4/2007 | Bates, III et al. | |
| 2007/0084786 A1 * | 4/2007 | Smithies | 210/490 |
| 2007/0125700 A1 | 6/2007 | Ding et al. | |
| 2007/0190319 A1 | 8/2007 | Kalayci | |
| 2007/0264520 A1 | 11/2007 | Wood et al. | |
| 2007/0271883 A1 | 11/2007 | Chung et al. | |
| 2007/0283808 A1 | 12/2007 | Chung et al. | |
| 2008/0017038 A1 | 1/2008 | Wu | |
| 2008/0022643 A1 * | 1/2008 | Fox et al. | 55/521 |
| 2008/0026661 A1 | 1/2008 | Fox et al. | |
| 2008/0032110 A1 | 2/2008 | Wood et al. | |
| 2008/0060328 A1 * | 3/2008 | Devine | 55/486 |
| 2008/0105626 A1 | 5/2008 | Jones et al. | |
| 2008/0108265 A1 | 5/2008 | Pourdeyhimi et al. | |
| 2008/0110822 A1 | 5/2008 | Chung et al. | |
| 2008/0134652 A1 | 6/2008 | Lim et al. | |
| 2008/0160856 A1 | 7/2008 | Chen et al. | |
| 2008/0302242 A1 | 12/2008 | Schelling et al. | |
| 2009/0120868 A1 | 5/2009 | Huppchen et al. | |
| 2009/0266759 A1 | 10/2009 | Green | |
| 2010/0000411 A1 | 1/2010 | Wertz et al. | |
| 2010/0031618 A1 | 2/2010 | Grove, III | |
| 2010/0044289 A1 | 2/2010 | Koslow | |
| 2010/0282682 A1 | 11/2010 | Eaton et al. | |
| 2010/0285101 A1 | 11/2010 | Moore et al. | |
| 2011/0147976 A1 | 6/2011 | Wertz et al. | |

FOREIGN PATENT DOCUMENTS

| | | |
|---|---|---|
| DE | 20 2005 019 004 U1 | 5/2007 |
| DE | 10 2005 059 214 A1 | 6/2007 |
| DE | 10 2005 059 214 B4 | 10/2007 |
| DE | 10 2006 017 553 | 12/2007 |
| DE | 20 2007 015 994 U1 | 2/2008 |
| EP | 0 462 574 A1 | 12/1991 |
| EP | 1 048 335 A1 | 11/2000 |
| EP | 1 048 335 B1 | 4/2005 |
| EP | 1 721 555 A1 | 11/2006 |
| EP | 1 775 006 | 4/2007 |
| EP | 1 795 248 A3 | 3/2008 |
| EP | 1 483 039 | 4/2008 |
| JP | 2008-95266 | 4/2008 |
| WO | WO 00/02006 | 1/2000 |
| WO | WO 01/98574 | 12/2001 |
| WO | WO 02/20668 | 3/2002 |
| WO | WO 03/064006 | 8/2003 |
| WO | WO 03/064013 | 8/2003 |
| WO | WO 2004/028662 A2 | 4/2004 |
| WO | WO 2004/069378 | 8/2004 |
| WO | WO 2004/112937 | 12/2004 |
| WO | WO 2005/034659 | 4/2005 |
| WO | WO 2006/030407 A1 | 3/2006 |
| WO | WO 2006/049664 | 5/2006 |
| WO | WO 2006/053295 | 5/2006 |
| WO | WO 2006/071979 | 7/2006 |
| WO | WO 2006/071980 | 7/2006 |
| WO | WO 2006/096180 A1 | 9/2006 |
| WO | WO/2007/024445 | 3/2007 |
| WO | WO 2007/041310 | 4/2007 |
| WO | WO 2007/041311 | 4/2007 |
| WO | WO 2007/068302 | 6/2007 |
| WO | WO 2007/068408 | 6/2007 |
| WO | WO 2007/068444 | 6/2007 |

(56) References Cited

FOREIGN PATENT DOCUMENTS

| WO | WO 2007/112443 | 10/2007 |
|----|----------------|---------|
| WO | WO 2008/011450 | 1/2008  |
| WO | WO 2008/016771 | 2/2008  |
| WO | WO 2008/057397 | 5/2008  |
| WO | WO 2008/057431 | 5/2008  |
| WO | WO 2008/066813 | 6/2008  |
| WO | WO 2008/150548 A2 | 12/2008 |

OTHER PUBLICATIONS

International Preliminary Report on Patentability for Application No. PCT/US2008/082759 mailed May 20, 2010.

* cited by examiner

MELTBLOWN FILTER MEDIUM

CROSS-REFERENCE TO RELATED APPLICATION

This application claims priority under 35 U.S.C. §119(e)(1) to U.S. Ser. No. 60/986,642, filed Nov. 9, 2007, the entire contents of which are hereby incorporated by reference.

FIELD

The disclosure generally relates to filter media, as well as related assemblies, systems and methods.

BACKGROUND

Filter media are used in a variety of systems. The media are typically used to remove undesirable materials (e.g., particles) from a liquid or gas by passing the liquid or gas through the media.

SUMMARY

The disclosure generally relates to filter media, as well as related assemblies, systems and methods.

In one aspect, the disclosure features an article that includes first, second and third layers. The second layer includes a meltblown material. The third layer includes an adhesive and is between the first and second layers.

In another aspect, the disclosure features an article that includes a first layer, a second layer and a third layer. Optionally, the third layer can be a scrim. The second layer includes a meltblown material. The scrim is between the first and second layers, or the second layer is between the first layer and the scrim.

In a further aspect, the disclosure features an article that includes first, second and third layers. The second layer includes a meltblown material, and the third layer is between the first and second layers. The article is a filter medium.

In an additional aspect, the disclosure features an assembly that includes a housing and a filter medium supported by the housing. The filter medium can be, for example, any of the articles described in the preceding three paragraphs.

In yet another aspect, the disclosure features a filter medium having an initial dust capture efficiency of at least 90%, and a dust holding capacity of at least 50 g/m².

In still another aspect, the disclosure features a filter medium having a periodic dust capture efficiency of at least 90%, and a dust holding capacity of at least 50 g/m².

In another aspect, the disclosure features a filter medium having an initial cleanability test time of at least four hours.

In a further aspect, the disclosure features a filter medium having a soot particle capture efficiency of at least 80%.

In an additional aspect, the disclosure features a filter medium having a NaCl particle filtration efficiency of at least 30% and a NaCl particle capture test time of at least 40 minutes.

In yet a further aspect, the disclosure features a filter medium having a liquid filtration efficiency of at least 45%.

In still another aspect, the disclosure features a method that includes forming any of the articles and/or filter media described in the preceding paragraphs of summary.

In another aspect, the disclosure features a method that includes adhering a meltblown material to an article comprising a substrate to provide a filter medium.

In an additional aspect, the disclosure features a method that includes supporting a meltblown material with a scrim to provide a first article, and bonding the first article and a substrate together to provide a filter medium.

In a further aspect, the disclosure features a filter medium that includes first and second layers. The second layer may be different from the first layer. The second layer includes a first meltblown material. The first layer can be, for example, a meltblown material or an electrospun material. In some embodiments, the first and second layers are supported by another layer.

In another aspect, the disclosure features a filter medium that includes first, second and third layers. The second layer includes a plurality of fibers, and the second layer has a thickness of at least five microns. The third layer includes a scrim or an adhesive material.

In yet another aspect, the disclosure features any of the articles and/or filter media described in the preceding paragraphs of the summary, with an aged cleanability test time that is at least 70% of the initial cleanability test time.

In still another aspect, the disclosure features a filter medium having aged cleanability test time that is at least 70% of the initial cleanability test time.

In an additional aspect, the disclosure features an article or filter medium as described in any of the preceding paragraphs of the summary, with a liquid filtration retention efficiency of at least 60%.

In a further aspect, the disclosure features a filter medium having a liquid filtration retention efficiency of at least 60%.

In an additional aspect, the disclosure features an article that includes a substrate and a meltblown material bonded to the substrate.

In another aspect, the disclosure features a meltblown layer having a plurality of crests and valleys, a distance between adjacent valleys being at least 400 microns.

In yet another aspect, the disclosure features an article that includes a first layer and a second layer bonded to the first layer, the second layer comprising fibers having an average diameter of at most 1.5 microns.

In one aspect, the disclosure feature an article that includes a first layer having first and second sides; a second layer comprising a meltblown material; and a material between the first side of the first layer and the second layer. The article has a corrugation channel width of at least 150 mils, a corrugation depth of at least 8 mils on the first side of the first layer, and a corrugation depth of at least 8 mils on the second side of the first layer.

In another aspect, the disclosure features an article that includes a first layer having first and second sides; a second layer comprising fibers; and a material between the first side of the first layer and the second layer. At least 5% of the fibers in the second layer extend a distance of at least 0.3 micron in a direction substantially perpendicular to a surface of the second layer. The article has a corrugation channel width of at least 150 mils, a corrugation depth of at least 8 mils on the first side of the first layer, and a corrugation depth of at least 8 mils on the second side of the first layer.

In a further aspect, the disclosure features an article that includes a first layer having first and second sides; a second layer comprising fibers having a fiber diameter geometric standard deviation of greater than 1.3; and a material between the first side of the first layer and the second layer. The article has a corrugation channel width of at least 150 mils, a corrugation depth of at least 8 mils on the first side of the first layer, and a corrugation depth of at least 8 mils on the second side of the first layer.

In an additional aspect, the disclosure features a first layer having first and second sides; a second layer comprising a meltblown material; and a material between the first side of the first layer and the second layer. The article is a corrugated article having a retained corrugation of at least 25%.

In one aspect, the disclosure features an article that includes a first layer having first and second sides; a second layer comprising fibers, at least 5% of the fibers in the second layer extending a distance of at least 0.3 micron in a direction substantially perpendicular to a surface of the second layer; and a material between the first side of the first layer and the second layer. The article is a corrugated article having a retained corrugation of at least 25%.

In another aspect, the disclosure features an article that includes a first layer having first and second sides; a second layer comprising fibers having a fiber diameter geometric standard deviation of greater than 1.3; and a material between the first side of the first layer and the second layer. The article is a corrugated article having a retained corrugation of at least 25%.

In a further aspect, the disclosure features a article that includes a first layer; a second layer comprising a meltblown material; and an adhesive material between the first and second layers. The adhesive material is present in at least 70% of the area between the first and second layers.

In an additional aspect, the disclosure features an article that includes a first layer; a second layer comprising fibers; and an adhesive material between the first and second layers. The adhesive material is present in at least 70% of the area between the first and second layers, and at least 5% of the fibers in the second layer extend a distance of at least 0.3 micron in a direction substantially perpendicular to a surface of the second layer.

In one aspect, the disclosure features an article that includes a first layer; a second layer comprising fibers; and an adhesive material between the first and second layers. The adhesive material is present in at least 70% of the area between the first and second layers, and the fibers in the second layer have a fiber diameter geometric standard deviation of greater than 1.3.

In another aspect, the disclosure features an article that includes a first layer; a second layer comprising a meltblown material; and an adhesive material between the first and second layers. The mean peel strength between the first and second layers is at least 0.5 ounce per inch.

In a further aspect, the disclosure features an article that includes a first layer; a second layer comprising fibers, at least 5% of the fibers in the second layer extending a distance of at least 0.3 micron in a direction substantially perpendicular to a surface of the second layer; and an adhesive material between the first and second layers. The mean peel strength between the first and second layers is at least 0.5 ounce per inch.

In an additional aspect, the disclosure features an article that includes a first layer; a second layer comprising fibers having a fiber diameter geometric standard deviation of greater than 1.3; and an adhesive material between the first and second layers. The mean peel strength between the first and second layers is at least 0.5 ounce per inch.

In one aspect, the disclosure features an article that includes a first layer; a second layer comprising a meltblown material; and an adhesive material between the first and second layers. The adhesive material has an open time of at least 15 seconds.

In another aspect, the disclosure features an article that includes a first layer; a second layer comprising fibers; and an adhesive material between the first and second layers. The adhesive material has an open time of at least 15 seconds, and at least 5% of the fibers in the second layer extend a distance of at least 0.3 micron in a direction substantially perpendicular to a surface of the second layer.

In a further aspect, the disclosure features an article that includes a first layer; a second layer comprising fibers; and an adhesive material between the first and second layers. The adhesive material has an open time of at least 15 seconds, and the fibers in the second layer have a geometric standard deviation of greater than 1.3.

In an additional aspect, the disclosure features an article that includes a first layer, and a second layer comprising a meltblown material. The article has a Beta decay of at most 20% at a particle size of four microns.

In yet another aspect, the disclosure features a method that includes using a pressure of from 20 pounds per linear inch to 40 pounds per linear inch to adhere a meltblown material to an article comprising a substrate to provide a filter medium.

Embodiments may exhibit one or more of the following advantages.

Embodiments may provide one or more of the following advantages. In certain embodiments, the filter medium can be relatively durable, relatively good at capturing fine particles, relatively good at holding material (e.g., dust), exhibit relatively good cleanability, relatively good soot capture, and/or relatively good liquid filtration. In some embodiments, the filter medium can simultaneously exhibit advantages that are typically not simultaneously provided by at least some known filter media. As an example, in certain embodiments, the filter medium can be effective at capturing fine particles while also being relatively durable. As another example, in some embodiments, the filter medium efficiently captures particles while also having a good ability to hold materials (e.g., dust). As a further example, in certain embodiments, the filter medium can exhibit increased particle capture efficiency while maintaining or increasing particle capture capacity. In certain embodiments, the filter medium, as well as related filter systems, can be prepared in a relatively quick, inexpensive and/or simple manner. In some embodiments, the processes disclosed herein can be used to provide a corrugated article (e.g., corrugated filter medium) that has good corrugation properties. As an example, a corrugated article can include a substrate (that is corrugated as provided) having an adhesive and additional layer disposed thereon, whereon the corrugation properties (e.g., corrugation depth) of the final article is not substantially different from the corrugation depth of the substrate as provided prior to having the adhesive and additional layers disposed thereon. As an another example, a corrugated article can include a substrate (that is corrugated as provided) having an adhesive and additional layer disposed thereon, whereon the corrugation properties (e.g., corrugation depth) of the side of the article having the adhesive and additional layer are not substantially different from the corrugation depth of the other side of the article.

BRIEF DESCRIPTION OF THE FIGURES

The disclosure may be better understood based on the description below as well as the figures, in which.

DETAILED DESCRIPTION

Figure 1:
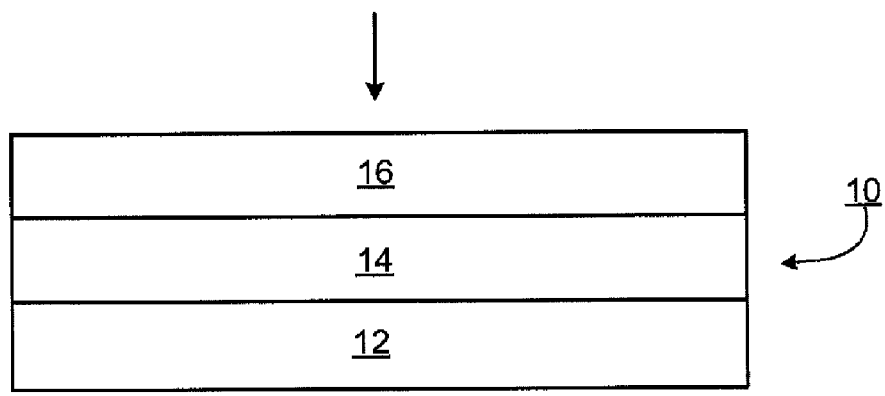
FIG. 1 is a cross-sectional view of a filter medium.
Figure 2:
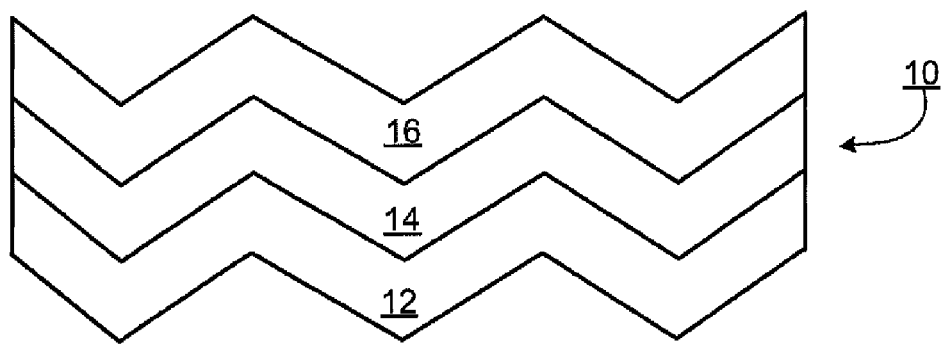
FIG. 2 is a cross-sectional view of a pleated filter medium.
Figure 3:
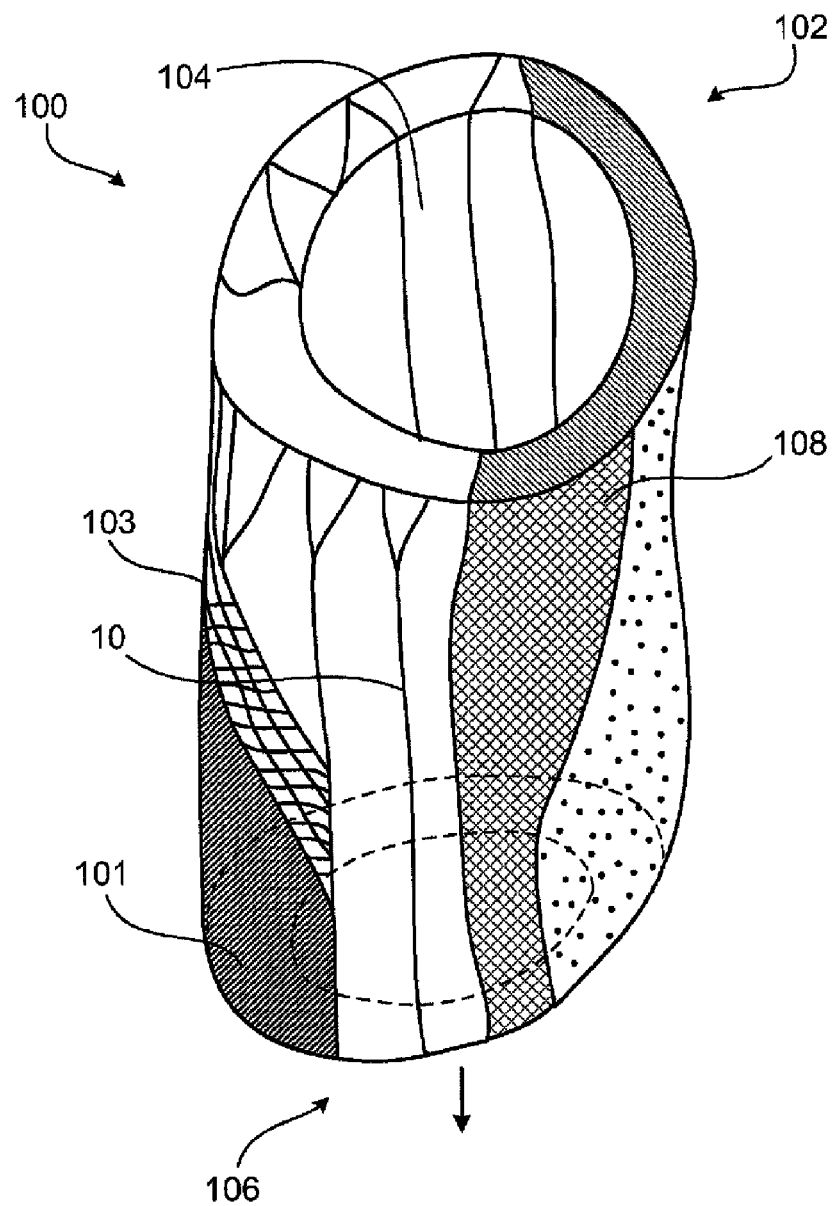
FIG. 3 is partial cut-away perspective view of a filter assembly including a filter medium.

The disclosure generally relates to filter media, as well as related assemblies, systems and methods. FIG. 1 is a cross-sectional view of an exemplary filter medium 10 that includes a substrate 12, an intermediate layer 14 and a meltblown layer 16. FIG. 2 depicts a typical pleated configuration of filter medium 10. FIG. 3 shows a cut-away perspective of an exemplary filter assembly 100 including a filter housing 101, a filter cartridge 102, an inner screen 108 and an outer screen 103. Filter medium 10 is disposed in filter cartridge 102. During use, a gas enters assembly 100 via an opening 104 and then passes through inner screen 108, filter medium 10 and outer screen 103. The gas then exits filter assembly 100 via opening 106.

I. Filter Medium

A. Substrate

Substrate 12 is generally used to provide mechanical integrity to filter medium 10.

Substrate 12 can be formed from one or more layers of material. Examples of materials include glasses, celluloses, synthetic materials, ceramics, polymers, cotton, hemp, carbon and metals. Typically, substrate 12 includes fibers of one or more materials. Exemplary classes of fibers include natural fibers, organic fibers and inorganic fibers. Combinations of fibers and/or materials can be used. In certain embodiments, substrate 12 may include one or more layers that do not contain fibers. Examples of non-fibrous materials that may be used in substrate 12 include open cell foam structures. Open cell foam structures can, for example, be made of polymers, such as polyolefins and polystyrenes.

Substrate 12 may be made using any suitable method. In some embodiments, substrate 12 is made by a method that includes web forming (e.g., wet laid, dry laid, direct laid), carding, spun bonding, melt blowing and film fibrillation. The particular configuration of the substrate can depend on the intended application of the filter media, and the particular configuration can be varied to achieve the desired structural properties, including stiffness, strength, pleatability, temperature resistance. As an example, when filter medium 10 is designed for use in heavy duty air filtration systems, gas turbine filtration systems, automotive air filtration systems, and/or pulse cleaning applications, substrate 12 may be a wet-laid paper, such as cellulose or a synthetic/cellulose blend. As another example, when filter medium 10 is designed for use in HVAC filtration systems, liquid filtration systems, HEPA filtration systems, and/or battery separators, substrate 12 may be a wet-laid paper (e.g., made from cellulose, glass and/or synthetic fibers), carded nonwovens, spunbonds, meltblowns, or air laid (e.g., synthetic or cellulose).

In general, substrate 12 may have any desired thickness. Typically, substrate 12 is at least 200 microns (e.g., 300 microns, 400 microns, 500 microns, 600 microns) thick, and/or at most 1500 microns (e.g., 1400 microns, 1300 microns, 1200 microns, 1100 microns, 1000 microns) thick. In some embodiments, substrate 12 has a thickness of from 200 microns to 1500 microns (e.g., 200 microns to 1000 microns, 400 microns to 1000 microns). As referred to herein, the thickness of substrate 12 is determined according to TAPPI T411.

The basis weight of substrate 12 is usually selected so that substrate 12 provides a desired amount of mechanical integrity to filter medium 10. In certain embodiments, substrate 12 has a basis weight of at least 25 g/m$^2$ (e.g., 50 g/m$^2$, 75 g/m$^2$), and/or at most 250 g/m$^2$ (e.g. 200 g/m$^2$, 150 g/m$^2$). For example, in some embodiments, substrate 12 has a basis weight of from 25 g/m$^2$ to 200 g/m$^2$ (e.g., from 50 g/m$^2$ to 200 g/m$^2$, from 75 g/m$^2$ to 150 g/m$^2$). As referred to herein, basis weight is determined according to ASTM D-846.

Substrate 12 can be designed to have any desired air permeability. In some embodiments, substrate 12 has an air permeability of at least three cubic feet per minute (CFM) (e.g., 10 CFM, 25 CFM), and/or at most 400 CFM (e.g., 300 CFM, 200 CFM, 150 CFM, 100 CFM). As an example, in certain embodiments, substrate 12 has an air permeability of from two CFM to 400 CFM (e.g., from 10 CFM to 300 CFM, from 25 CFM to 200 CFM). As used herein, air permeability is determined at a pressure of 0.5 inch water column according to ASTM F778-88.

Substrate 12 can also be designed to have any desired filtration efficiency. In certain embodiments, substrate 12 has a NaCl particle filtration efficiency (measured with flow rate of 32 liters per minute) of less than 10% (e.g., less than 8%, less than 5%) (see discussion below regarding the test for NaCl particle filtration efficiency).

While shown in FIG. 1 as being continuous, in some embodiments, substrate 12 can be discontinuous. For example, substrate 12 could be formed of filaments (yarns) which themselves could be continuous or discontinuous. Additionally or alternatively, substrate 12 could be in the form of a material with holes in it (e.g., in the form of a mesh). Additionally or alternatively, substrate 12 could be in the form of patches (e.g., dots) of material.

B. Intermediate Layer

1. Adhesive

In some embodiments, layer 14 is formed of an adhesive (e.g., a hot melt adhesive, a pressure sensitive adhesive, a thermoplastic adhesive, a thermoset adhesive) that is adhered to layers 12 and 16. Generally, the adhesive is a polymer. Examples of polymers include ethylene vinyl acetate copolymers, polyolefins (e.g., polyethylenes, polypropylenes, amorphous polyolefin), polyamides (e.g., nylons), epoxies, cyanoacrylates, polyurethanes (e.g., moisture cured polyurethanes) and polyesters. In some embodiments, the adhesive is an ethylene vinyl acetate copolymer. Examples of commercially available materials include amorphous polyolefin adhesives available from Bostik (Wauwatosa, Wis.) under tradenames HM 4379, M2751 and H3199, and from Heartland (Germantown, Wis.) under tradename H312. Examples of commercially available materials also include copolyesters available from Bostik (Wauwatosa, Wis.) under tradenames HM4199, HM4156 and Vitel 4361B. Examples of commercially available materials further include polyamides available from Bostik (Wauwatosa, Wis.) under tradenames HM 4289LV and HM4229.

In some embodiments, layer 14 is formed of a web of fibers less than 4 micron in diameter with a geometric standard deviation of 1.4

The thickness of adhesive layer 14 can generally be selected as desired. In some embodiments, the thickness of adhesive layer 14 is at least five microns (e.g., at least 10 microns, at least 25 microns), and/or at most 100 microns (e.g., at most 75 microns, at most 50 microns). For example, the thickness of adhesive layer 14 can be from five microns to 100 microns (e.g., from five microns to 75 microns, from five microns to 50 microns) as determined by scanning electron microscopy.

In general, the basis weight of adhesive layer 14 can be selected as desired. In some embodiments, adhesive layer 14 has a basis weight of at most 10 g/m² (at most 8 g/m², at most 5 g/m²), and/or at least 0.5 g/m² (e.g., at least 1 g/m², at least 2 g/m²). For example, in some embodiments, adhesive layer 14 can have a basis weight of from 0.5 g/m² to 10 g/m² (e.g., from 1 g/m² to 8 g/m², from 2 g/m² to 5 g/m²).

While shown in FIG. 1 as being continuous, in some embodiments, adhesive 14 can be discontinuous. For example, adhesive 14 could be in the form a material with holes in it (e.g., in the form of a mesh). Additionally or alternatively, adhesive 14 could be in the form of patches (e.g., dots) of material. Typically, the amount of adhesive 14 between layers 12 and 16 is sufficient to provide appropriate adhesion between layers 12 and 16 when considering the intended use of article 10. For example, in some embodiments, adhesive 14 is present in at least 70% (e.g., at least 75%, at least 80%, at least 85%, at least 90%, at least 95%, at least 99%, 100%) of the area between layers 12 and 14.

In general, adhesive 14 is selected to such that the mean peel strength between layers 12 and 16 is at least 0.5 ounce per inch of width (e.g., at least one ounce per inch of width, at least 1.5 ounces per inch of width). In some embodiments, adhesive 14 is selected so that the mean peel strength between layers 12 and 16 is at most four ounces per inch of width. As used herein, the "mean peel strength" of a first layer/adhesive/second layer configuration is determined as follows. The test is a modified version of ASTM D903, using a Thwing-Albert Intellect II tensile tester. Samples are cut to two inches by seven inches coupons, and the peeling is done in the machine direction. TUFFLEX (TF4150 85447) tape from Intertape Inc. (Montreal, Quebec, Canada) is applied to the length of the coated surface of the specimen to firmly bond to the top layer to be able to separate the laminate. A half inch prepeel is used to start the delamination. The tester cross head and top air grip moves at a speed 12 inches per minute from the stationary bottom air grip. The test is complete when the cross-head and the top air grip moves four inches from the initial position. The maximum peel strength and minimum peel strength are recorded as a function of the load measured by the load cell. The mean peel strength is calculated from the loads measured by the load cell during the entirety of the test. All peel strengths are divided in half to report a peel strength per inch width by dividing by two.

Generally, adhesive 14 is selected to have an appropriate open time for the manufacturing process below. For example, the open time of adhesive 14 should be sufficient so that it does not become non-adhesive between the time it is applied to one layer (e.g., layer 12 or layer 16) and the time adhesive 14 contacts the other layer (e.g., layer 16 or layer 12). In some embodiments, adhesive 14 has an open time of at least 15 seconds (e.g., at least 20 seconds, at least 30 seconds at least 40 seconds). In certain embodiments, layer 14 has an open time of at most 60 seconds. As used herein, the "open time" of an adhesive is determined according to ASTM D4497 using a 1/16 inch wide bead of adhesive.

2. Scrim

In some embodiments, layer 14 serves as a carrier layer (scrim) for meltblown layer 16 (see process discussion below). In such embodiments, scrim 14 is typically bonded together with layers 12 and 16 (e.g., laminated together).

Scrim 14 can be, for example, formed of a polymer. Examples of polymers include polyesters, polyamides and polyolefins. Optionally, scrim 14 is formed of a spunbond nonwoven material or a carded nonwoven material. In some embodiments, scrim 14 is formed of a spunbond polypropylene.

Generally, the thickness of scrim 14 can be selected as desired. In certain embodiments, scrim 14 is at least 50 microns (e.g., at least 100 microns, at least 200 microns) thick, and/or at most 1000 microns (e.g., 900 microns, 750 microns) thick. For example, the thickness of scrim 14 can be from 50 microns to 1000 microns (e.g. from 100 microns to 900 microns, from 250 microns to 750 microns) thick. As referred to herein, the thickness of scrim 14 is determined according to TAPPI T411.

In general, the basis weight of scrim 14 can be selected as desired. In some embodiments, adhesive layer 14 has a basis weight of at most 100 g/m² (at most 90 g/m², at most 75 g/m²), and/or at least five g/m² (e.g., at least 10 g/m², at least 20 g/m²). For example, in some embodiments, adhesive layer 14 can have a basis weight of from five g/m² to 100 g/m² (e.g., from five g/m² to 90 g/m², from five g/m² to 75 g/m²).

While shown in FIG. 1 as being continuous, in some embodiments, scrim 14 can be discontinuous. For example, scrim 14 could be in the form a material with holes in it (e.g., in the form of a mesh). Additionally or alternatively, scrim 14 could be in the form of patches (e.g., dots) of material.

C. Meltblown Layer

Layer 16 is formed via meltblown process, as discussed below. In general, layer 16 is formed of fibers having an average diameter of at most 1.5 microns (e.g., at most 1.4 microns, at most 1.3 microns, at most 1.2 microns, at most 1.1 microns, at most one micron), and/or at least 0.2 micron (e.g., at least 0.3 micron, at least 0.4 micron, at least 0.5 micron), as measured using scanning electron microscopy. As an example, in some embodiments, layer 16 is formed of fibers having an average diameter of from 0.2 micron to 1.5 microns (e.g., from 0.3 microns to 1.4 microns, from 0.4 micron to 1.3 microns). As another example, in certain embodiments, layer 16 is formed of fibers having an average diameter of from 0.2 micron to 0.5 micron (e.g., from 0.3 micron to 0.5 micron, from 0.4 micron to 0.5 micron, from 0.2 micron to 0.4 micron, from 0.2 micron to 0.3 micron, from 0.3 micron to 0.4 micron). In general, at least 5% (e.g., at least 10%, at least 25%, at least 50%, at least 60%, at least 75%) of the fibers in the meltblown material extend a distance of at least 0.3 micron in a direction substantially perpendicular to a surface of the second layer as indicated by the arrow in FIG. 1.

Typically, the meltblown material is formed of one or more polymers. Exemplary polymers include polyolefins (e.g., polypropylenes), polyesters (e.g., polybutylene terephthalate, polybutylene naphthalate), polyamides (e.g., nylons), polycarbonates, polyphenylene sulfides, polystyrenes, polyurethanes (e.g., thermoplastic polyurethanes). Optionally, the polymer(s) may contain fluorine atoms. Examples of such polymers include PVDF and PTFE.

Layer 16 can generally have any desired thickness. In some embodiments, layer 16 is at least 5 microns (e.g. at least 10 microns, at least 20 microns) thick, and/or at most 250 microns (e.g., 200 microns, 150 microns) thick. For example, layer 16 can be from five microns to 250 microns (e.g., from 10 microns to 200 microns, from 20 microns to 150 microns) thick. The thickness of layer 16 is determined using scanning electron microscopy. Without wishing to be bound by theory, it is believed that, using the processes described herein, it is possible to obtain a layer of meltblown fibers that is thicker than is typical and/or economically feasible for a layer of electrospun fibers, and/or that is thinner and/or economically feasible than is typical (e.g., due to considerations of, for example, mechanical integrity) for a layer of meltblown fibers.

The basis weight of layer 16 can typically be selected as desired. In some embodiments, the basis weight of layer 16 is at least one g/m² (e.g., at least 10 g/m², at least 25 g/m²), and/or at most 100 g/m² (at most 90 g/m², at most 75 g/m²). For example, in certain embodiments, layer 16 has a basis weight of from one g/m² to 100 g/m² (e.g., from 10 g/m² to 90 g/m², from 25 g/m² to 75 g/m²). Without wishing to be bound by theory, it is believed that, using the processes described herein, it is possible to obtain a layer of meltblown fibers that has a basis weight greater than is typical and/or economically feasible for a layer of electrospun fibers, and/or that has a basis weight that is less than is typical (e.g., due to considerations of, for example, mechanical integrity and/or instantaneous lamination) for a layer of meltblown fibers.

The air permeability of layer 16 can also be varied as desired. In some embodiments, layer 16 has an air permeability of at most 500 CFM (e.g., at most 250 CFM, at most 200 CFM), and or at least 20 CFM (e.g., at least 50 CFM, at least 100 CFM). For example, in some embodiments, the air permeability of layer 16 can be from 20 CFM to 500 CFM (e.g., from 50 CFM to 250 CFM, from 100 CFM to 200 CFM). Typically, the air permeability of layer 16 (Perm) is determined by the equation $(1/Perm)=(1/Perm_1)+(1/Perm_2)$, where Perm is the air permeability of filter medium 10 (including layers 12, 14 and 16), $Perm_1$ is the air permeability of meltblown layer 16, and $Perm_2$ is the air permeability of substrate layer 12. For example, the air permeability of filter medium 10 where meltblown layer 16 has an air permeability of 300 CFM, and substrate 12 has an air permeability of 70 CFM would be 56.8 CFM because 1/56.8=1/300+1/70.

While shown in FIG. 1 as being continuous, in some embodiments, layer 16 can be discontinuous. For example, layer 16 could be in the form a material with holes in it (e.g., in the form of a mesh). Additionally or alternatively, layer 16 could be in the form of patches (e.g., dots) of material.

D. Filter Medium Properties

In general, the thickness of filter medium 10 may be selected as desired. The thickness of filter medium 10 is the distance from the outer surface of layer 12 to the outer surface of layer 16. In embodiments in which layer 14 is an adhesive, filter medium 10 can have a thickness of the article that is at least 200 microns (e.g., at least 300 microns, at least 400 microns), and/or a thickness of most 1500 microns (e.g., at most 1000 microns, at most 750 microns). For example, in such embodiments, filter medium 10 has a thickness of from 200 microns to 1500 microns (e.g., from 300 microns to 1000 microns, from 400 microns to 750 microns). In embodiments in which layer 14 is a scrim, filter medium 10 can have a thickness of the article is at least 200 microns (e.g., at least 300 microns, at least 400 microns), and/or a thickness of most 2500 microns (e.g., at most 2000 microns, at most 1500 microns). For example, in such embodiments, filter medium 10 has a thickness of from 200 microns to 2500 microns (e.g., from 300 microns to 2000 microns, from 400 microns to 1500 microns).

Generally, filter medium 10 can have any desired basis weight. In embodiments in which layer 14 is an adhesive, filter medium 10 can have a basis weight of at most 500 g/m² (e.g. at most 400 g/m², at most 300 g/m²), and or at least 30 g/m² (e.g., at least 75 g/m², at least 100 g/m²). In embodiments in which layer 14 is a scrim, filter medium 10 can have a basis weight of at most 600 g/m² (e.g. at most 500 g/m², at most 400 g/m²), and or at least 50 g/m² (e.g., at least 100 g/m², at least 150 g/m²).

The air permeability of filter medium 10 can usually be selected as desired. In some embodiments, the air permeability of filter medium 10 is at most 300 CFM (e.g., at most 200 CFM, at most 100 CFM), and/or at least one CFM (e.g., at least 10 CFM, at least 25 CFM). For example, in some embodiments, filter medium 10 can have an air permeability of from one CFM to 300 CFM (e.g., from 10 CFM to 200 CFM, from 25 CFM to 100 CFM).

In some embodiments, filter medium 10 can exhibit a good ability to capture dust. For example, in some embodiments, filter medium 10 has an initial dust capture efficiency of at least 80% (e.g., at least about 85%, at least about 90%) (see discussion below for description of initial dust capture efficiency test). In certain embodiments, filter medium 10 has a periodic dust capture efficiency that is at least about 90% (e.g., at least about 95%, at least about 97%) (see discussion below for description of periodic dust capture efficiency test). In some embodiments, filter medium 10 has an initial dust capture efficiency of at least 80% (e.g., at least about 85%, at least about 90%) and a periodic dust capture efficiency that is at least about 90% (e.g., at least about 95%, at least about 97%.)

In certain embodiments, filter medium 10 can have good dust holding properties. For example, in certain embodiments, filter medium 10 can have a dust holding capacity of at least 50 g/m² (e.g., at least 60 g/m², at least 70 g/m²) (see discussion below for description of dust holding capacity test).

In some embodiments, filter medium 10 has both good dust capture and good dust holding properties. As an example, in some embodiments, filter medium 10 has an initial dust capture efficiency of at least 80% (e.g., at least about 85%, at least about 90%) and a dust holding capacity of at least 50 g/m² (e.g., at least 60 g/m², at least 70 g/m²). As another example, in some embodiments, filter medium 10 has a periodic dust capture efficiency of at least 90% (e.g., at least about 95%, at least about 97%) and a dust holding capacity of at least 50 g/m² (e.g., at least 60 g/m², at least 70 g/m²). Without wishing to be bound by theory, it is believed that, simultaneously providing good dust capture and good dust holding properties can result, in some embodiments at least, from the processes described herein, by which the article can include a layer of meltblown fibers that has a relatively small average fiber diameter (e.g., 0.8 micron or less) and is less dense and is thicker than electrospun coatings.

In certain embodiments, filter medium 10 has good fine particle capture properties. As an example, in some embodiments, filter medium 10 has a NaCl particle capture test time of at least 40 minutes (e.g., at least 50 minutes, at least 60 minutes, at least two hours (see discussion below for description of NaCl particle capture test).

In some embodiments, dust can be relatively easily removed from filter medium 10. For example, in some embodiments, filter medium 10 has an initial cleanability test time of at least four hours (e.g., at least five hours, at least six hours) (see discussion below for description of initial cleanability test). In certain embodiments, filter medium 10 has an aged cleanability test time of at 70% (e.g., at least 80%, at least 90%) of the initial cleanability test time (see discussion below for description of aged cleanability test).

In some embodiments, filter medium 10 can exhibit good NaCl particle filtration efficiency and good NaCl particle capture. For example, in some embodiments, filter medium 10 can have a NaCl particle filtration efficiency of at least 30% (e.g., at least 40%, at least 50%) and a NaCl particle capture test time of at least 40 minutes (e.g., at least 50 minutes, at least 60 minutes) (see discussion below for description of NaCl particle capture efficiency test and NaCl particle capture test). Without wishing to be bound by theory, it is believed that, simultaneously providing good NaCl particle filtration efficiency and good NaCl particle capture can result, in some embodiments at least, from the processes described herein, by which the article can include a layer of meltblown fibers that has a relatively small average fiber diameter (e.g., 0.8 micron or less) and is less dense and is thicker than electrospun coatings.

In certain embodiments, filter medium 10 can have good liquid filtration properties. For example, in certain embodiments, filter medium 10 has a liquid filtration efficiency of at least 45% (e.g., at least 50%, at least 60%) at a given particle size (see discussion below for description of liquid filtration efficiency test). As another example, in some embodiments, filter medium 10 has a liquid filtration retention efficiency of at least 60% (e.g., at least 65%, at least 70%) at a given particle size and time (see discussion below for description of liquid filtration efficiency test).

In certain embodiments, article 10 can have a Beta decay of at most 20% (e.g., at most 15%, at most 10%, at most 5%) at a particle size of four microns. In some embodiments, article 10 has a Beta decay of at least 1% at a particle size of four microns. As used herein, the "Beta decay at a particle size of four microns" of an article is determined according to the ISO 16889:1999 test procedure.

In some embodiments, an article can be corrugated. Optionally, a corrugated article can also be pleated.

Figure 4:
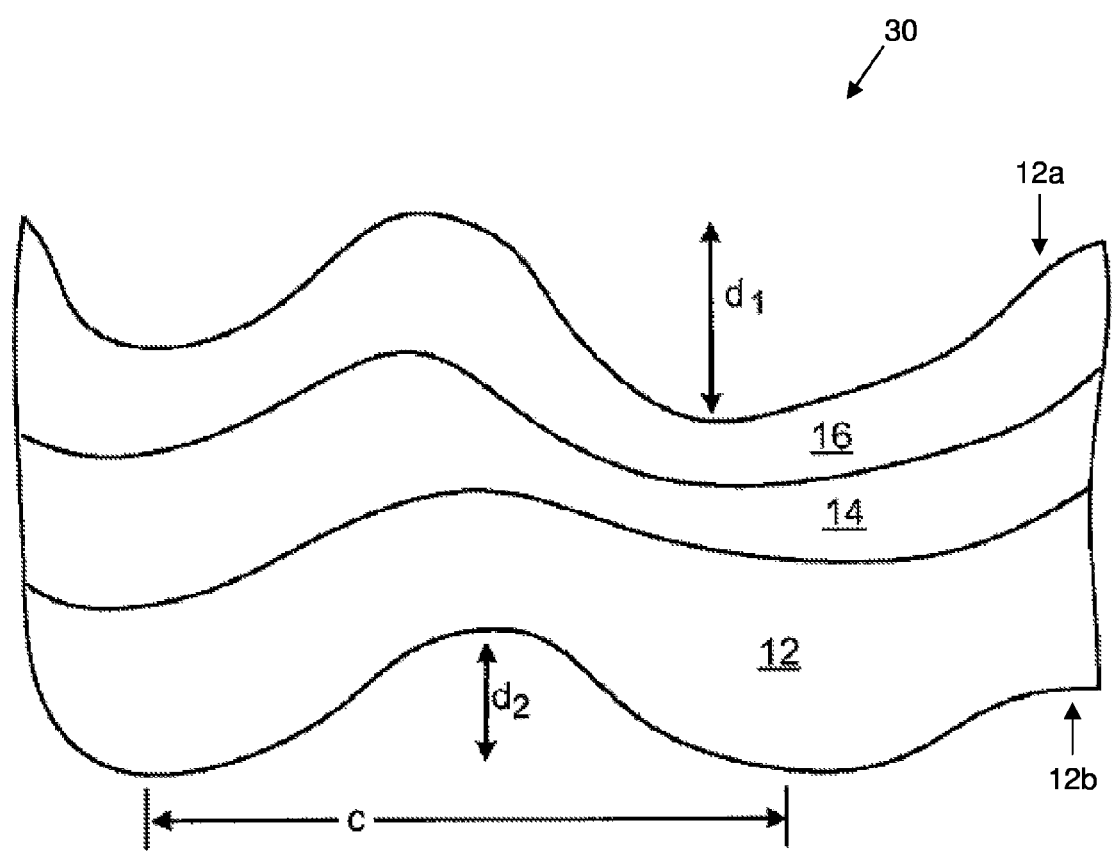
FIG. 4 is a cross-sectional view of a corrugated filter medium.

FIG. 4 shows an article 30 having a substrate 12, an adhesive 14 and a meltblown layer 16. Article 30 has a repeat corrugation pattern with a corrugation channel width depicted by a distance "c", which is the distance from one peak to its nearest neighboring peak in the repeat corrugation pattern. In general, article 30 can have any desired corrugation channel width. In some embodiments, corrugation channel width "c" is at least 150 mils (e.g., at least 160 mils, from 167 mils to 173 mils, at least 225 mils, at least 250 mils, from 247 mils to 253 mils, from 150 mils to 335 mils).

In some embodiments, article 30 has a corrugation depth on a side 12A of substrate 12 that is depicted by a distance "d1", which is the distance from a peak of layer 16 to a valley of layer 14 in the repeat corrugation pattern. In some embodiments, corrugation depth "d1" is at least 8 mils (e.g., at least 10 mils, at least 12 mils, at least 14 mils, at least 16 mils), and/or at most 25 mils (e.g., at most 20 mils).

In certain embodiments, article 30 has a corrugation depth on a side 12B of substrate 12 that is depicted by a distance "d2", which is the distance from a peak of side 12B of substrate 12 to a valley of side 12B of substrate 12 in the repeat corrugation pattern. In some embodiments, corrugation depth "d2" is at least 8 mils (e.g., at least 10 mils, at least 12 mils, at least 14 mils, at least 16 mils), and/or at most 25 mils (e.g., at most 20 mils).

In some embodiments, article 30 has a retained corrugation of at least 25% (e.g., at least 30%, at least 40%, at least 50%, at least 60%, at least 70%). As referred to herein, the "retained corrugation" of article 30 is determined by dividing the corrugation depth "d1" by the distance from a peak of side 12A substrate 12 to a valley of side 12A of substrate 12 (measured before layer 14 is applied to side 12A of substrate 12) in the repeat corrugation pattern, and multiplying this value by 100%. Without wishing to be bound by theory, it is believed that the retained corrugation may result from the processes disclosed herein in which layer 12 is formed on a separate web from layer 16, and these layers are subsequently adhered to each other. In some instances, selecting appropriate pressure can enhance the retained corrugation, if the pressure selected is high enough to achieve desired adhesion while being low enough to achieve advantageous retained corrugation properties.

II. Filter Assemblies and Systems

Filter assembly 100 can be any of a variety of filter assemblies. Examples of filter assemblies include gas turbine filter assemblies, heavy duty air filter assemblies, automotive air filter assemblies, HVAC air filter assemblies, HEPA filter assemblies, vacuum bag filter assemblies, fuel filter assemblies, and oil filter assemblies. Such filter assemblies can be incorporated into corresponding filter systems (gas turbine filter systems, heavy duty air filter systems, automotive air filter systems, HVAC air filter systems, HEPA filter systems, vacuum bag filter systems, fuel filter systems, and oil filter systems). Vacuum filter bag systems are commonly used in home vacuum cleaners. In such embodiments, the filter medium can optionally be prepared by coating a paper with the meltblown material. In certain embodiments, the filter medium can be prepared using a wet laid or dry laid product (e.g., cellulose, polymer, glass). The filter medium can optionally be pleated into any of a variety of configurations (e.g., panel, cylindrical).

The orientation of filter medium 10 relative to gas flow through a filter assembly/filter system can generally be selected as desired. In some embodiments, meltblown layer 16 is upstream of substrate 12 in the direction of gas flow through the filter assembly/system. In certain embodiments, meltblown layer 16 is downstream of substrate 12 in the direction of gas flow through the filter assembly/system. As an example, in some embodiments in which the gas filter system is a gas turbine filter system or a heavy duty air filter system, meltblown layer 16 can be upstream of substrate 12 in the direction of gas flow through the filter assembly/system. As another example, in some embodiments in which improved depth filtration is desired, meltblown layer 16 can be downstream of substrate 12 in the direction of gas flow through the filter assembly/system.

III. Methods of Manufacturing Filter Medium

1. Adhesive

In general, in embodiments in which adhesive layer 14 is used, the manufacturing method involves applying layer 14 to substrate 12, and subsequently applying meltblown layer 16 to adhesive 14, so that, within filter medium 10, substrate 12 and meltblown layer 16 are both adhered to adhesive layer 14.

In some embodiments, manufacture of filter medium 10 with adhesive layer 14 involves a continuous (e.g., roll-to-roll) process. The process can, for example, involve the use of multiple roll-to-roll systems. As an example, one roll-to-roll system can be used to form meltblown layer 16, and another roll-to-roll system can be used to adhere layer 14 to substrate 12. In such a system, the roll-to-roll systems can be configured so that, in a continuous fashion, adhesive layer 14 contacts meltblown layer 16 and these two layers become adhered to each other.

Figure 5:
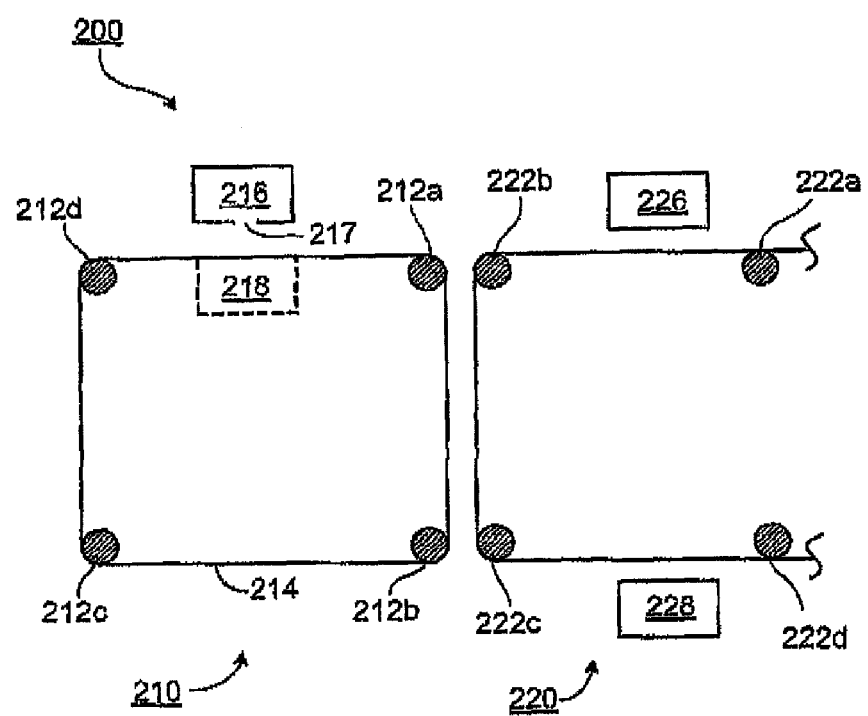
FIG. 5 is schematic view of a system configured to be used in the manufacture of a filter medium.

FIG. 5 shows an embodiment of a system 200 that can be used to form filter medium 10 having adhesive layer 14. System 200 includes a first roll-to-roll system 210 and a second roll-to-roll system 220.

System 210 includes rollers 212a, 212b, 212c and 212d that move a continuous belt 214 as the rollers rotate. System 212 also includes an extruder 216. As rollers 212a-212d are rotating, the polymer(s) (e.g., optionally with one or more additives) are vacuum drawn into extruder 216, and the polymer is heated (generally slowly) from the beginning of the extruder to the end, allowing the polymer(s) to flow more easily. The heated polymer(s) is(are) fed into a melt pump which controls the throughput (lb/hr) of the polymer(s). The polymer(s) then goes through a die tip with a series of holes. It is believed that, in some embodiments, the throughput of polymer per hole can have a relatively a strong affect on fiber diameter. Heated, high velocity air impinges the polymer on either side of the die tip as the polymer comes out of the die tip. It is believed that this air can attenuate the fiber to the final fiber size. It is believed that, in some embodiments, as the process air throughput increases, the fiber diameter can decrease, and/or that, as the process air temperature increases, the fiber diameter can decrease. In the area where fiber attenuation occurs, quench air is present, which forms an area where fiber formation occurs at the same temperature year round. The distance from the die tip to the collector allows us to control the density of the material (e.g., as the collector distance is increased, the fiber velocity is decreased and the fiber temperature is reduced so packing of the fibers is less dense, resulting in a more lofty web). As the distance is increased, the velocity of the fiber is generally decreased, making a loftier filter media. The collector suction is also controlled, which also impacts the loft of the material. It is believed that, in some embodiments, as the belt speed is increased, the web basis weight of the filter medium can decrease, and/or that, as the polymer throughput increases, the basis weight of the filter medium can increase.

The size of the holes and number of holes per inch for the die can generally be selected as desired. In some embodiments, the die can have 35 holes per inch with 0.0125" holes. In certain embodiments, the die can have 70 holes per inch with 0.007" holes. Other dies can optionally be used.

System 220 includes rollers 222a, 222b, 222c and 222d that move substrate 12 as the rollers rotate. Between rollers 222a and 222b, system 220 includes a station 226 that applies an adhesive to substrate 12. In a region adjacent rollers 222b and 212a, the adhesive contacts meltblown layer 16, and meltblown layer 16 is removed from belt 214 and adhered to the adhesive. The substrate/adhesive/meltblown layer composite then passes through a charging unit 228. Charging unit 228 is used to charge the composite (in general, particularly the meltblown layer). It is believed that this can result in a filter medium having enhanced fine particle capture properties. It is believed that the charging process can embed charges in the meltblown material.

Station 226 can generally be selected as desired. In some embodiments (e.g., when it is desirable to have a relatively high coverage of adhesive), station 226 can be a metered adhesive system. The metered adhesive system can be configured to apply a relatively highly dispersed and uniform amount of adhesive. In certain embodiments, station 226 is a Nordson Precision Metered Gear Adhesion applicator system with Signature nozzles, which can have 12 nozzles per inch that provide dispersed adhesion lanes with a two millimeter gap between center points of the lanes and with each nozzle having a 0.06 inch diameter orifice.

In general, the temperature is selected to properly soften (e.g., melt) the material that is to be formed into layer 16. As an example, in some embodiments, the material is heated to a temperature of at least 350° F. (e.g., at least 375° F., at least 400° F.), and or at most 600° F. (e.g., 550° F., at most 500° F.). For example, the material can be heated to a temperature of from 350° F. to 600° F. (e.g., from 375° F. to 550° F., from 400° F. to 500° F.).

In general, the process air is the heated air on either side of the die tip where the fibers are formed. This heated air (typically the same temperature as the die tip) impinges the fibers and helps attenuate the fibers to the final fiber size. It is believed that, in some embodiments, as the air volume increases, the fiber diameter can decrease. The process air volume can be selected as appropriate. In some embodiments, the process air volume is at least 2500 pounds/hour-meter (e.g., at least 2750 pounds/hour-meter, at least 3000 pounds/hour-meter), and/or at most 4000 pounds/hour-meter (e.g., at most 3750 pounds/hour-meter, at most 3500 pounds/hour-meter). For example, the process air volume can be from 2500 pounds/hour-meter to 4000 pounds/hour-meter (e.g., from 2750 pounds/hour-meter to 3750 pounds/hour-meter, from 3000 pounds/hour-meter to 3500 pounds/hour-meter).

The vacuum created by vacuum 218 can be selected as appropriate. In some embodiments, the vacuum is at least 10 inches of water (e.g., at least 12 inches of water, at least 14 inches of water), and/or at most 26 inches of water (e.g., at most 23 inches of water, at most 20 inches of water). For example, the vacuum can be from 10 inches of water to 26 inches of water (e.g., from 12 inches of water to 23 inches of water, from 14 inches of water to 20 inches of water).

Belt 214 generally can be made of any material that allows the formation of layer 16 on belt 214, and also allows the removal of layer 16 from belt 214 when layer 16 contacts adhesive layer 14. Examples of materials from which belt 214 can be made include polymers (e.g., polyesters, polyamides), metals and/or alloys (e.g., stainless steel, aluminum).

The speed at which belt 214 moves can be selected as desired to form layer 16. In some embodiments, the belt 214 moves at a speed of least 10 ft/min (e.g., at least 20 ft/min, at least 30 ft/min), and/or at most 300 ft/min (e.g., at most 200 ft/min, at most 100 ft/min). For example, belt 214 can move at a speed of from 10 ft/min to 300 ft/min (e.g., from 20 ft/min to 200 ft/min, from 30 ft/min to 100 ft/min).

In general, when applied to substrate 12, the temperature of the adhesive can be selected so that it has an appropriate level of tack when it comes into contact with layer 16. In embodiments in which the adhesive is a hot melt adhesive, this can involve heating the adhesive prior to its application to substrate 12. For example, prior to being applied to substrate 12, the adhesive can be heated to a temperature of at least 350° F. (e.g., at least 370° F., at least 380° F.), and or at most 450° F. (e.g., 430° F., at most 420° F.). For example, the material can be heated to a temperature of from 350° F. to 450° F. (e.g., from 370° F. to 430° F., from 380° F. to 420° F.).

Substrate 12 is typically fed through the adhesive station by the pulling force generated via a nip formed at rollers 212a and 222b. By contacting substrate 12 adjacent roller 222b (e.g., a rubber roller, such as a 70 Shore A EPDM rubber roller) with meltblown material 16 adjacent roller 212a (e.g., a stainless steel roller, such as a stainless steel roller that is crowned by 0.025 inch), the speed of belt 214 and substrate 12 are synchronized (e.g., so that substrate 12 moves at approximately the same speed as belt 214). The pressure between rollers 212a and 222b is generally selected as desired for the intended use of article 10. For example, in embodiments in which article 10 is corrugated, the pressure between rollers 212a and 222b is typically selected to achieve good corrugation depth and conformity for article 10. In some embodiments, the pressure between rollers 212a and 222b is from 20 pounds per linear inch to 40 pounds per linear inch (e.g., from 25 pounds per linear inch to 35 pounds per linear inch, from 28 pounds per linear inch to 32 pounds per linear inch, from 29 pounds per linear inch to 31 pounds per linear inch, 30 pounds per linear inch).

In general, any of a variety of techniques can be used to charge the substrate/adhesive/meltblown layer composite to form an electret web. Examples include AC and/or DC corona discharge and friction-based charging techniques. In some embodiments, the composite is subjected to a discharge of at least 1 kV/cm (e.g., at least 5 kV/cm, at least 10 kV/cm), and/or at most 30 kV/cm (e.g., at most 25 kV/cm, at most 20 kV/cm). For example, in certain embodiments, the composite can be subjected to a discharge of from 1 kV/cm to 30 kV/cm (e.g., from 5 kV/cm to 25 kV/cm, from 10 kV/cm to 20 kV/cm). Exemplary processes are disclosed, for example, in U.S. Pat. No. 5,401,446, which, to the extent it is not inconsistent with the present disclosure, is incorporated herein by reference.

Figure 6:
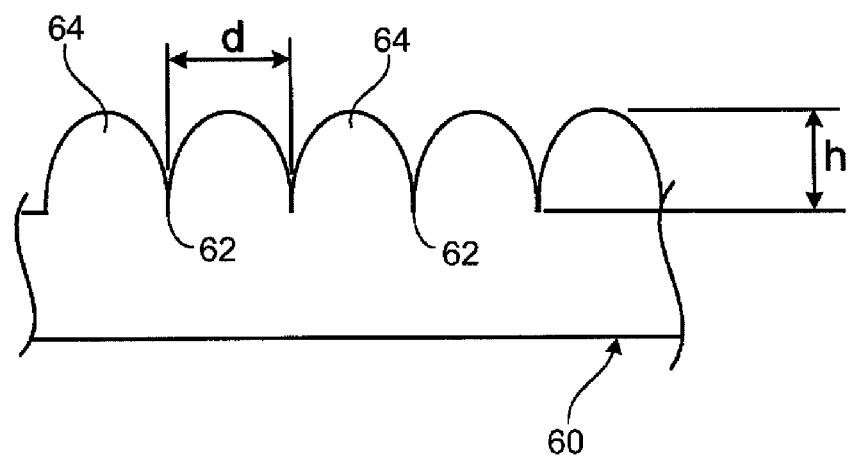
FIG. 6 is a cross-sectional view of a meltblown layer.

In general, any belt configuration can be used. For example, in some embodiments, the belt has an open structure, such as a mesh structure. Without wishing to be bound by theory, it is believed that such an open structure results in the meltblown material having a complementary structure to that of the belt because the meltblown material is under the force of the blown air. FIG. 6 shows a cross section of the meltblown material 60 having a series of crests 64 and valleys 62 resulting from the complementary shape of the belt. Without wishing to be bound by theory, it is believed that this structure may be present in the meltblown material in the filter medium, and that, during collection of dust or other particles, the dust may build up in the valleys, allowing for good dust removal during pulsing. In some embodiments, the distance d between adjacent valleys 62 is at least 400 microns (e.g., at least 500 microns, at least 700 microns), and/or at most 2000 microns (e.g., at most 1500 microns, at most 1200 microns). In some embodiments, the distance d between adjacent valleys 62 is from 400 microns to 2000 microns (e.g., from 500 microns to 1500 microns, from 700 microns to 1200 microns). In some embodiments, the distance h from a crest 64 to a valley 62 is at least 50 microns (e.g., at least 100 microns, at least 300 microns), and/or at most 2000 microns (e.g., at most 1500 microns, at most 1000 microns). In some embodiments, the distance h from a crest 64 to a valley 62 is from 50 microns to 2000 microns (e.g., from 200 microns to 1500 microns, from 300 microns to 1000 microns).

2. Scrim

In general, in embodiments in which scrim layer 14 is used, the manufacturing method involves applying meltblown layer 16 to scrim 14, subsequently applying substrate 12 to scrim 14, and then bonding the three layers together.

In some embodiments, manufacture of filter medium 10 with scrim layer 14 involves a continuous (e.g., roll-to-roll) process. The process can, for example, involve the use of multiple roll-to-roll systems. As an example, one roll-to-roll system can be used to form meltblown layer 16 on scrim 14, and another roll-to-roll system can be used to carry substrate 12. In such a system, the roll-to-roll systems can be configured so that, in a continuous fashion, the meltblown layer/scrim composite contacts substrate 12 to form a three layer composite, and the three layers are subsequently bonded together.

Figure 7:
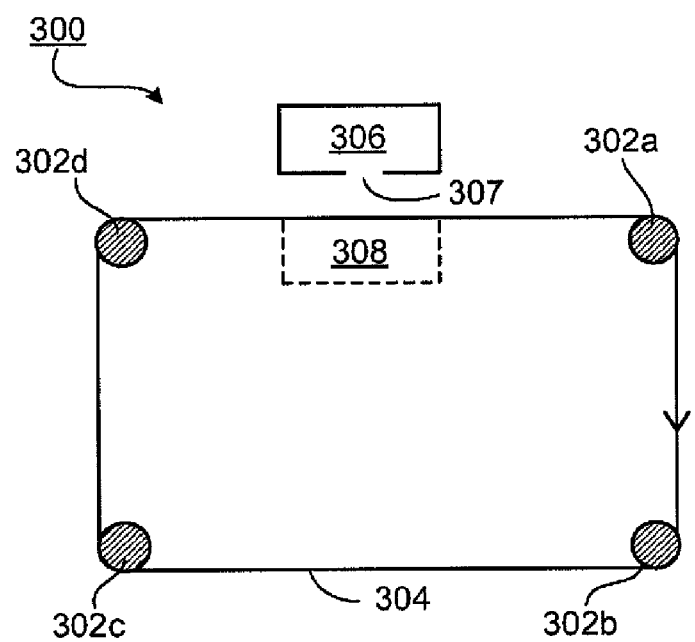
FIG. 7 is a schematic view of a system configured to be in the manufacture of a filter medium.

FIG. 7 shows an embodiment of a system 300 that can be used to form meltblown layer 16 on scrim 14. System 300 includes rollers 302a, 302b, 302c and 302d that move a continuous belt 304 as the rollers rotate. Scrim 14 is applied to belt 304. System 302 also includes an extruder 306. As rollers 302a-302d are rotating, extruder 306 is heated, and the material from which layer 16 is to be formed (e.g., a polymer in pellet form) is introduced into heated extruder 306. The material is softened (e.g., melted) and forced through a die 307 in the form of filaments. The filaments are moved toward scrim 14 under the influence of a vacuum 308 on the opposite side of belt 304 relative to die 307. The effect of the vacuum is to stretch the filaments and force them against the surface of scrim 14 to provide meltblown layer 16 disposed on scrim 14.

The process conditions used for the process described in FIG. 7 can generally be selected as desired to form layer 16. In general, the temperature is selected to properly soften (e.g., melt) the material that is to be formed into layer 16. As an example, in some embodiments, the material is heated to a temperature of at least 350° F. (e.g., at least 375° F., at least 400° F.), and or at most 600° F. (e.g., 550° F., at most 500° F.). For example, the material can be heated to a temperature of from 350° F. to 600° F. (e.g., from 375° F. to 550° F., from 400° F. to 500° F.).

In general, the process air is the heated air on either side of the die tip where the fibers are formed. This heated air (typically the same temperature as the die tip) impinges the fibers and helps attenuate the fibers to the final fiber size. It is believed that, in some embodiments, increasing the air volume can result in a reduced fiber diameter. The process air volume can be selected as appropriate. In some embodiments, the process air volume is at least 2500 pounds/hour-meter (e.g., at least 2750 pounds/hour-meter, at least 3000 pounds/hour-meter), and/or at most 4000 pounds/hour-meter (e.g., at most 3750 pounds/hour-meter, at most 3500 pounds/hour-meter). For example, the process air volume can be from 2500 pounds/hour-meter to 4000 pounds/hour-meter (e.g., from 2750 pounds/hour-meter to 3750 pounds/hour-meter, from 3000 pounds/hour-meter to 3500 pounds/hour-meter).

The vacuum created by vacuum 308 can be selected as appropriate. In some embodiments, the vacuum is at least 10 inches of water (e.g., at least 12 inches of water, at least 14 inches of water), and/or at most 26 inches of water (e.g., at most 23 inches of water, at most 20 inches of water). For example, the vacuum can be from 10 inches of water to 26 inches of water (e.g., from 12 inches of water to 23 inches of water, from 14 inches of water to 20 inches of water).

The speed at which belt 304 moves can be selected as desired to form layer 16. In some embodiments, the belt 304 moves at a speed of least 10 ft/min (e.g., at least 20 ft/min, at least 30 ft/min), and/or at most 300 ft/min (e.g., at most 200 ft/min, at most 100 ft/min). For example, belt 304 can move at a speed of from 10 ft/min to 300 ft/min (e.g., from 20 ft/min to 200 ft/min, from 30 ft/min to 100 ft/min).

The scrim/meltblown layer composite is removed from belt 304, and substrate 12 is disposed on scrim 14. Typically, this involves bringing scrim 14 onto a belt (e.g., belt 214) and then blowing the meltblown fibers directly onto scrim 14. Scrim 14 can have adhesive applied before the meltblown is blown on or the force and the heat of the meltblown fibers can be used to adhere the two layers together. The relevant process conditions are generally the same as above. The three layers are then bonded together. During this process, the three layers can optionally be laminated together. In some embodiments, the layers are ultrasonically bonded together (e.g., ultrasonically point bonded together). In some embodiments, meltblown layer 16, scrim 14 and substrate 12 can be joined by applying ultrasonic energy between an aluminum vibrating horn (½" contact width, from Branson Ultrasonics, Danbury, Conn.) and an engraved contact roll. In certain embodiment, the method involves using a horn pulsing at 20 kHZ applying 20 to 30 psi of contact pressure at an amplitude of 20 to 35 microns at a feed rate of 25 to 45 ft/min bonds the composite together at points comprising of less than 10% (e.g., less than 8%, less than 5%, less than 3%) of the total area as determined by the engraving on the contact roll.

The following examples are exemplary and not intended as limiting.

IV. Examples

A. Test Protocols

1. NaCl Particle Filtration Efficiency Test

A 100 cm$^2$ surface area of the filter medium was tested with NaCl (sodium chloride) particles having a 0.26 micron mass mean diameter with a geometric standard deviation less than 1.83, a concentration of 15 to 20 mg/cm$^3$, and a face velocity of 5.3 cm/s by a TS18130 CertiTest™ automated filter testing unit from TSI, Inc. equipped with a sodium chloride generator. The instrument measured a pressure drop across the filter media and the resultant penetration value on an instantaneous basis at a flow rate less than or equal to 115 liters per minute (lpm). Instantaneous readings were defined as 1 pressure drop/penetration measurement. This test is described in ASTM D2 986-91. The NaCl particle filtration efficiency is $[100-(C/C_0)]*100\%$, where C was the particle concentration after passage through the filter and $C_0$ was the particle concentration before passage through the filter.

2. Initial Dust Capture Efficiency, Periodic Dust Capture Efficiency and Dust Holding Capacity A 100 cm$^2$ surface area of the filter medium was challenged with a fine dust (0.1-80 µM) at a concentration of 200 mg/m$^3$ with a face velocity of 20 cm/s for one minute. The dust capture efficiency was measured using a Palas MFP2000 fractional efficiency photodetector. The dust capture efficiency was $[(100-[C/C0])*100\%]$, where C was the dust particle concentration after passage through the filter and C0 was the particle concentration before passage through the filter. The dust capture efficiency was measured after one minute and is referred to herein as the initial dust capture efficiency. The dust capture efficiency was also measured periodically after one minute and is referred to herein as the periodic dust capture efficiency. The dust holding capacity is measured when the pressure reaches 1800 Pa, and is the difference in the weight of the filter medium before the exposure to the fine dust and the weight of the filter medium after the exposure to the fine dust.

3. Initial Cleanability Test and Aged Cleanability Test

An AC fine dust at 16 g/hr was sent through the filter medium at a face velocity of 5 cm/s, and then subject to 150 millisecond pulse at 4 bar to remove particles from the medium when the medium reaches a pressure of 10 mBar. This process (exposure to the AC fine dust under the stated conditions until reaching a pressure of 10 mBar) is repeated a total of 30 times, and the initial cleanability time is the amount of time it takes to complete the 30 cycles. The medium is then aged by continuous exposure to the AC dust (12 g/hr) for 10,000 Cycles and pulsed 14 times per minute. After this ageing process, the filter medium is again exposed to the AC fine dust under the conditions noted above 30 times, and the aged cleanability time is the amount of time it takes to complete these 30 cycles. This test is performed on a Palas MMTC-2000 Cleanability test stand by VDI-3926 type 2 Procedure with a test area of 177 cm$^2$.

4. NaCl Particle Capture Test

A surface area of 100 cm$^2$ was exposed to an aerosol of 0.4 to 0.5 µM NaCl particles at 2% concentration at a face velocity of 8.3 cm/s with a total flow volume of 45 liters/min. The NaCl particle capture test time is the amount of time it takes to reach a pressure of 1800 Pa.

5. Liquid Filtration Efficiency Test and Liquid Filtration Retention Efficiency

Using a FTI Multipass Filter Test Stand (Fluid Technologies Inc., Stillwater, Okla.), an A2 fine dust is fed at a rate of 0.3 liters per minute into Mobil MIL-H-5606 fuel for a total flow rate of 1.7 liters per minute to contact the filter medium per ISO 16889 until a terminal pressure of 174 KPa above the baseline filter pressure drop is obtained. Particle counts (particles per milliliter) are taken at the particle size selected (in this case 4, 5, 7, 10, 15, 20, 25 and 30 microns) upstream and downstream of the media are taken at ten points equally divided over the time of the test. The average of upstream and downstream particle counts are taken at each selected particle size. From the average particle count upstream (injected $–C_0$) and the average particle count downstream (passed thru-C) the liquid filtration efficiency test value for each particle size selected is determined by the relationship $[(100-[C/C_0])*100\%]$. The liquid filtration retention efficiency as a function of time and particle size can also be measured by comparing the upstream and downstream particle counts (and determining efficiency $[(100-[C/C0])*100\%]$) at the sequential ten points in the test.

B. Examples

1. Sample A

Sample A was prepared by forming a 7 g/m$^2$ (gsm) meltblown web from 0.8 micron polypropylene fibers (Exxon PP3546 G, ExxonMobil Chemical Company, Houston, Tex.) produced at a polymer heated to 475° F. at rate of 36 lbs of polymer/hr from a 35 holes per inch die blown by process air heated to 475° F. at a flow rate of 3900 bs/hr while quenching with 55° F. air of 390 lbs/hr. The meltblown material was collected and instantaneously bonded onto a 10 gsm spunbond polypropylene nonwoven scrim (Celestra from Fiberweb Corporation, Nashville, Tenn.) moving on a collector belt moving at 55 ft/min with a vacuum pressure of approximately 18 inches of water through a 7 inch wide slot. The meltblown was adhered to the spunbond giving a composite structure with caliper of 0.0055", a basis weight of 18 gsm, air permeability of 91 cfm at 0.5" water column. The resulting filter media had a pressure drop of 1.5 mm H2O @ 10.5 FPM face velocity, as determined with a TSI 8130 filtration tester. The NaCl particle filtration efficiency was 82.2%.

The meltblown nanofiber/scrim combination was adhered to a support layer formed from a cellulose fiber containing 17% vinyl acetate resin and 83% cellulosic fiber wet laid nonwoven with a basis weight of 139 gsm and an air permeability of 80 cfm at 0.5" water. The meltblown nanofiber/spunbond was ultrasonically point bonded (3% bond area) to a cellulose support with the cellulose support positioned on the downstream side of the meltblown nanofiber scrim with the scrim positioned upstream of the meltblown nanofiber.

The filter media had a basis weight of 156 gsm, a caliper of 0.030" and an air permeability of 38 cfm at 0.5" water column. The NaCl particle filtration efficiency was 87.5%. This is an improvement over the uncoated cellulose substrate (approximately 11%). The spunbond scrim has essentially no ability to capture fine particles.

2. Sample B

Sample B was prepared by forming a 1 gsm meltblown web from 0.25 micron polypropylene fibers (Exxon PP3546 G, ExxonMobil Chemical Company, Houston, Tex.) produced at a polymer heated to 425° F. at rate of 2 lbs of polymer/hr from a 70 holes per inch die blown by process air heated to 450° F. at a flow rate of 3250 lbs/hr while quenching with 55° F. air at 350 lbs/hr. The meltblown material was collected and instantaneously bonded onto a 10 gsm spunbond polypropylene scrim (Celestra from Fiberweb Corporation, Nashville, Tenn.) moving on a collector belt moving at 30 ft/min with a vacuum pressure of approximately 20 inches of water through a 7 inch wide slot. The meltblown was adhered to the spunbond giving a composite structure with caliper of 0.0034", a basis weight of 11 gsm, air permeability of 328 cfm at 0.5" water column. The resulting filter media had a pressure drop of 0.4 mm H2O @ 10.5 FPM face velocity, as determined with a TSI 8130 filtration tester. The NaCl particle filtration efficiency was 47%.

The meltblown nanofiber/scrim combination was adhered to a support layer formed from a cellulose fiber containing 17% vinyl acetate resin and 83% cellulosic fiber wet laid nonwoven with a basis weight of 139 gsm and an air permeability of 80 cfm at 0.5" water. The meltblown nanofiber/spunbond was ultrasonically bonded to a cellulose support with the cellulose support positioned on the downstream side of the meltblown nanofiber scrim with the scrim positioned upstream of the meltblown nanofiber.

The filter media had a basis weight of 156 gsm, a caliper of 0.032" and an air permeability of 53 cfm at 0.5" water column. The NaCl particle filtration efficiency was 53%. This is an improvement over the uncoated cellulose substrate (approximately 11%). The spunbond scrim has essentially no ability to capture fine particles.

3. Sample C

Sample C was prepared by forming a 2 gsm meltblown web from 0.32 micron polypropylene fibers (Exxon PP3546 G, ExxonMobil Chemical Company, Houston, Tex.) produced at a polymer heated to 425° F. at rate of 12 lbs of polymer/hr from a 70 holes per inch die blown by process air heated to 450° F. at a flow rate of 3250 lbs/hr while quenching with 55° F. air at 350 lbs/hr. The meltblown material was collected and instantaneously bonded onto a 10 gsm spunbond polypropylene scrim (Celestra from Fiberweb Corporation, Nashville, Tenn.) moving on a collector belt moving at 75 ft/min with a vacuum pressure of approximately 20 inches of water through a 7 inch wide slot. The meltblown was adhered to the spunbond giving a composite structure with caliper of 0.0052", a basis weight of 12 gsm, air permeability of 335 cfm at 0.5" water column. The resulting filter media had a pressure drop of 0.3 mm H2O @ 10.5 FPM face velocity, as determined with a TSI 8130 filtration tester. The NaCl particle filtration efficiency was 36%.

The meltblown nanofiber/scrim combination was adhered to a support layer formed from a cellulose fiber containing 17% vinyl acetate resin and 83% cellulosic fiber wet laid nonwoven with a basis weight of 139 gsm and an air permeability of 80 cfm at 0.5" water.

The meltblown nanofiber/spunbond was ultrasonically bonded to a cellulose support with the cellulose support positioned on the downstream side of the meltblown nanofiber scrim with the scrim positioned upstream of the meltblown nanofiber.

The filter media had a basis weight of 156 gsm, a caliper of 0.031" and an air permeability of 56 cfm at 0.5" water column. The NaCl particle filtration efficiency was 49%. This is an improvement over the uncoated cellulose substrate (approximately 11%).

4. Sample D

Sample D was prepared by forming a 5 gsm meltblown web from 0.7 micron polypropylene fibers (Exxon PP3546 G, ExxonMobil Chemical Company, Houston, Tex.) produced from a polymer heated to 425° F. at rate of 20 lbs of polymer/hr from a 70 holes per inch die blown by process air heated to 450° F. at a flow rate of 3250 lbs/hr while quenching with 55° F. air at 490 lbs/hr. The meltblown material was collected and instantaneously bonded onto a 10 gsm spunbond polypropylene nonwoven scrim (Celestra from Fiberweb Corporation, Nashville, Tenn.) moving on a collector belt moving at 50 ft/min with a vacuum pressure of approximately 20 inches of water through a 7 inch wide slot. The meltblown was adhered to the spunbond giving a composite structure with caliper of 0.004", a basis weight of 15 gsm, air permeability of 111 cfm at 0.5" water column.

The meltblown nanofiber/scrim combination was adhered to a support layer formed from a cellulose fiber containing 17% vinyl acetate resin, 15% polyester fibers and 68% cellulosic fiber wet laid nonwoven with a basis weight of 122 gsm and an air permeability of 94 cfm at 0.5" water.

The meltblown nanofiber/spunbond was adhered to the cellulose support by application of a hot melt glue (Bostik HM 4379 Amorphous Polyolefin (APO)) spray at an areal weight of 4 g/m2 to the cellulose support and then immediately bonding the glue applied layer to the meltblown/nanofiber cellulose by contact pressure between two rubber rolls. The article was made into a filter element having the scrim layer facing the inlet and the meltblown nanofiber in the middle and the cellulose support facing the downstream side.

The filter media had a basis weight of 136 gsm, a caliper of 0.031" and an air permeability of 51 cfm at 0.5" water column. The NaCl particle filtration efficiency was 68%. This is an improvement over the uncoated cellulose substrate (approximately 11%).

5. Sample E

Sample E was prepared by forming a 5 gsm meltblown web from 0.5 micron polypropylene fibers (Exxon PP3546 G, ExxonMobil Chemical Company, Houston, Tex.) produced from a polymer heated to 425° F. at rate of 20 lbs of polymer/hr from a 70 holes per inch die blown by process air heated to 450° F. at a flow rate of 3250 lbs/hr while quenching with 55° F. air at 490 lbs/hr. The meltblown material was collected on the bare collector belt moving at 45 ft/min with a vacuum pressure of approximately 20 inches of water through a 7 inch wide slot. The free standing nanofiber meltblown had a caliper of less than 0.001", a basis weight of 5 gsm, air permeability of 100 cfm at 0.5" water column.

The meltblown nanofiber was adhered to a support layer formed from a cellulose fiber containing 17% vinyl acetate resin 15% polyester fibers and 68% cellulosic fiber wet laid nonwoven with a basis weight of 122 gsm and an air permeability of 94 cfm at 0.5" water.

The meltblown nanofiber/spunbond was adhered to the cellulose support by application of a hot melt glue (Bostik HM 4379 APO) spray at an areal weight of 4 g/m2 to the cellulose support and then immediately bonding the glue applied layer to the meltblown/nanofiber cellulose by contact pressure between a belt used to collect the meltblown fibers and a rubber roller. The article was made into a filter element having the meltblown nanofiber facing the inlet and the cellulose support facing the downstream side.

The filter media had a basis weight of 133 gsm, a caliper of 0.029" and an air permeability of 50 cfm at 0.5" water column. The NaCl particle filtration efficiency was 63%. This is an improvement over the uncoated cellulose substrate (approximately 1%). The mean peel strength of nanofiber layer from the base substrate was 0.5 ounce per inch width.

6. Sample F

Sample F was prepared by forming a 5 gsm meltblown web from 0.7 micron polypropylene fibers (Exxon PP3546 G, ExxonMobil Chemical Company, Houston, Tex.) produced from a polymer heated to 425 F at rate of 20 lbs of polymer/hr from a 70 holes per inch die blown by process air heated to 435 F at a flow rate of 3900 lbs/hr while quenching with 55° F. air at 520 lbs/hr. The meltblown material was collected on the bare collector belt moving at 60 ft/min with a vacuum pressure of approximately 20 inches of water through a 7 inch wide slot. The free standing nanofiber meltblown had a caliper of less than 0.001", a basis weight of 5 gsm, air permeability of 172 cfm at 0.5" water column.

The meltblown nanofiber was adhered to a support layer formed from a cellulose fiber containing 17% vinyl acetate resin and 83% cellulosic fiber wet laid nonwoven with a basis weight of 125 gsm and an air permeability of 32 cfm at 0.5" water.

The meltblown nanofiber was adhered to the cellulose support by application of a hot melt glue (Bostik HM 4379 APO) spray at an areal weight of 4 g/m2 to the cellulose support and then immediately bonding the glue applied layer to the meltblown/nanofiber cellulose by contact pressure between a belt used to collect the meltblown fibers and a rubber roller. The article was made into a filter element having the meltblown nanofiber facing the inlet and the cellulose support facing the downstream side.

The filter media had a basis weight of 134 gsm, a caliper of 0.027" and an air permeability of 27 cfm at 0.5" water column. The NaCl particle filtration efficiency was 50%. This is an improvement over the uncoated cellulose substrate (approximately 20%).

7. Sample G

Sample G was prepared by forming a 3 gsm meltblown web from 0.7 micron polypropylene fibers (Exxon PP3546 G, ExxonMobil Chemical Company, Houston, Tex.) produced from a polymer heated to 425° F. at rate of 20 lbs of polymer/hr from a 70 holes per inch die blown by process air heated to 435° F. at a flow rate of 4250 lbs/hr while quenching with 55° F. air at 520 lbs/hr. The meltblown material was collected on the bare collector belt moving at 100 ft/min with a vacuum pressure of approximately 17 inches of water through a 7 inch wide slot. The free standing nanofiber meltblown had a caliper of less than 0.001", a basis weight of 3 gsm, air permeability of 300 cfm at 0.5" water column.

The meltblown nanofiber was adhered to a support layer formed from cellulose fiber containing 17% vinyl acetate resin and 83% cellulosic fiber wet laid nonwoven with a basis weight of 125 gsm and an air permeability of 32 cfm at 0.5" water.

The meltblown nanofiber/spunbond was adhered to the cellulose support by application of a hot melt glue (Bostik HM 4379 APO) spray at an areal weight of 4 g/m2 to the cellulose support and then immediately bonding the glue applied layer to the meltblown/nanofiber cellulose by contact pressure between a belt used to collect the meltblown fibers and a rubber roller. The resulting article was made into a filter having the meltblown nanofiber facing the inlet and the cellulose support facing the downstream side.

The filter media had a basis weight of 129 gsm, a caliper of 0.025" and an air permeability of 29 cfm at 0.5" water column. The NaCl particle filtration efficiency was 37%. This is an improvement over the uncoated cellulose substrate (approximately 20%).

8. Sample H

Sample H was prepared by forming a 3 gsm meltblown web from 0.7 micron polypropylene fibers (Exxon PP3546 G, ExxonMobil Chemical Company, Houston, Tex.) produced from a polymer heated to 425° F. at rate of 20 lbs of polymer/hr from a 70 holes per inch die blown by process air heated to 440° F. at a flow rate of 4360 lbs/hr while quenching with 55° F. air at 490 lbs/hr. The meltblown material was collected on the bare collector belt moving at 100 ft/min with a vacuum pressure of approximately 17 inches of water through a 7 inch wide slot. The free standing nanofiber meltblown had a caliper of less than 0.001", a basis weight of 3 gsm, air permeability of 307 cfm at 0.5" water column.

The meltblown nanofiber was adhered to a support layer formed from cellulose fiber containing 17% vinyl acetate resin and 83% cellulosic fiber wet laid nonwoven with a basis weight of 139 gsm and an air permeability of 89 cfm at 0.5" water.

The meltblown nanofiber was adhered to the cellulose support by application of a hot melt glue (Bostik HM 4379 APO) spray at an areal weight of 2 g/m2 to the cellulose support and then immediately bonding the glue applied layer to the meltblown/nanofiber cellulose by contact pressure between a belt used to collect the meltblown fibers and a rubber roller. The resulting article was made into a filter having the cellulose support facing the inlet and the meltblown nanofiber layer facing the downstream side.

The filter media had a basis weight of 143 gsm, a caliper of 0.029" and an air permeability of 69 cfm at 0.5" water column. The NaCl particle filtration efficiency was 30%. This is an improvement over the uncoated stiff backer support substrate (approximately 9%).

9. Sample I

Sample I was prepared by forming a 11 gsm meltblown web from 0.7 micron polypropylene fibers (Exxon PP3546 G, ExxonMobil Chemical Company, Houston, Tex.) produced from a polymer heated to 425° F. at rate of 30 lbs of polymer/hr from a 70 holes per inch die blown by process air heated to 440° F. at a flow rate of 4360 lbs/hr while quenching with 55° F. air at 490 lbs/hr. The meltblown material was collected on the bare collector belt moving at 37 ft/min with a vacuum pressure of approximately 20 inches of water through a 7 inch wide slot. The free standing nanofiber meltblown had a caliper of less than 0.003", a basis weight of 11 gsm, air permeability of 66 cfm at 0.5" water column.

The meltblown nanofiber was adhered to a stiff backer carded non-woven support layer formed from polymeric fibers with a basis weight of 107 gsm and an air permeability of 435 cfm at 0.5" water.

The meltblown nanofiber was adhered to the stiff backer carded non-woven support by application of a hot melt glue (Bostik HM 4379 APO) spray at an areal weight of 4 g/m2 to the cellulose support and then immediately bonding the glue applied layer to the meltblown/nanofiber by contact pressure between a belt used to collect the meltblown fibers and a rubber roller. The resulting article was made into a filter having the stiff backer carded nonwoven support facing the inlet and the meltblown nanofiber layer facing the downstream side.

The filter media had a basis weight of 113 gsm, a caliper of 0.024" and an air permeability of 57 cfm at 0.5" water column. The NaCl particle filtration efficiency was 88%. This is an improvement over the uncoated cellulose substrate (approximately 20%).

10. Sample J

Sample J was prepared by forming a 24 gsm meltblown web from 0.5 micron PBT fibers (Ticona Celanex 2008)

produced from a polymer heated to 530° F. at rate of 20 lbs of polymer/hr from a 35 holes per inch die blown by process air heated to 550° F. at a flow rate of 2600 lbs/hr. The meltblown material was collected on the bare collector belt moving at 30 ft/min with a vacuum pressure of approximately 20 inches of water through a 7 inch wide slot. The free standing nanofiber meltblown had a caliper of 0.008", a basis weight of 24 gsm, air permeability of 79 cfm at 0.5" water column.

The meltblown nanofiber was adhered to a support layer formed from a cellulose fiber containing 17% vinyl acetate resin 85% cellulosic fiber wet laid nonwoven with a basis weight of 165 gsm and an air permeability of 12 cfm at 0.5" water.

The 4 layers of the meltblown nanofiber/spunbond was ultrasonically bonded to a cellulose support with the cellulose support positioned on the upstream side and the meltblown nanofiber scrim on the downstream side.

The filter media had a basis weight of 287 gsm, a caliper of 0.045" and an air permeability of 7 cfm at 0.5" water column.

11. Sample K

Sample K was prepared by forming a 10 gsm meltblown web from 2 micron polypropylene fibers (Exxon PP3546 G, ExxonMobil Chemical Company, Houston, Tex.) produced at a polymer heated to 500° F. at rate of 240 lbs of polymer/hr from a 35 holes per inch die blown by process air heated to 500° F. at a flow rate of 3250 lbs/hr while quenching with 55° F. air at 350 lbs/hr. The meltblown material was collected and instantaneously bonded onto a 10 gsm spunbond polypropylene scrim (Celestra from Fiberweb Corporation, Nashville, Tenn.) moving on a collector belt moving at 250 ft/min with a vacuum pressure of approximately 20 inches of water through a 7 inch wide slot. To this meltblown/scrim composite, a nanofiber layer was added by forming a 4 gsm meltblown web from 0.5 micron polypropylene fibers (Exxon PP3546 G, ExxonMobil Chemical Company, Houston, Tex.) produced at a polymer heated to 425° F. at rate of 20 lbs of polymer/hr from a 35 holes per inch die blown by process air heated to 450° F. at a flow rate of 3250 lbs/hr while quenching with 55° F. air at 350 lbs/hr.

The resulting three layer composite had a nanofiber meltblown on the top surface, a conventional meltblown structure underneath and a scrim on the bottom surface.

The resulting composite had a basis weight of 25 gsm, a caliper of 0.012" and an air permeability of 84 cfm at 0.5" water column. The NaCl particle filtration efficiency was 88%.

12. Sample L

Sample L was prepared by forming a 5 gsm meltblown web from 0.4 micron polypropylene fibers (Exxon PP3546 G, ExxonMobil Chemical Company, Houston, Tex.) produced from a polymer heated to 450° F. at rate of 20 lbs of polymer/hr from a 35 holes per inch die blown by process air heated to 450° F. at a flow rate of 4360 lbs/hr while quenching with 55° F. air at 490 lbs/hr. The meltblown material was collected on the bare collector belt moving at 45 ft/min with a vacuum pressure of approximately 20 inches of water through a 7 inch wide slot. The free standing nanofiber meltblown had a caliper of less than 0.001", a basis weight of 5 gsm, air permeability of 150 cfm at 0.5" water column.

The meltblown nanofiber was adhered to a corrugated support layer formed from a cellulose fiber containing 20% vinyl acetate resin 80% cellulosic fiber wet laid nonwoven with a basis weight of 114 gsm and an air permeability of 16 cfm at 0.5" water. The corrugated support layer had a corrugation channel width of 0.170". The corrugation depth of the support layer was 0.022" on the felt side to be coated, the opposite (Wire) side had a corrugation depth of 0.022" as measured with the IAS Laser Corrugation Gauge.

The meltblown nanofiber was adhered to the cellulose support by application of a hot melt glue (Bostik M2751 adhesive) heated to 400° F. and sprayed at 410° F. at an areal weight of 6 g/m$^2$ to the cellulose support and then immediately bonding the glue applied layer to the meltblown/nanofiber cellulose by contact pressure between a stainless steel belt used to collect the meltblown fibers and a rubber roller at a nip pressure of 30 pounds per linear inch (PLI). The resulting article was made into a filter having the meltblown nanofiber facing the inlet and the cellulose support facing the downstream side.

The filter media had a basis weight of 125 gsm, a caliper of 0.026" and an air permeability of 14 cfm at 0.5" water column. The NaCl particle filtration efficiency was 62%. This is an improvement over the uncoated cellulose substrate (approximately 26%). This composite had a corrugation depth of 0.012" on the meltblown nanofiber coated side and 0.016" on the reversed, uncoated (wire) side. The mean peel strength of the nanofiber layer to the base substrate was 2.4 ounces per inch width.

13. Sample M

Sample M was prepared by forming a 5 gsm meltblown web from 0.4 micron polypropylene fibers (Exxon PP3546 G, ExxonMobil Chemical Company, Houston, Tex.) produced from a polymer heated to 450° F. at rate of 20 lbs of polymer/hr from a 35 holes per inch die blown by process air heated to 450° F. at a flow rate of 4360 lbs/hr while quenching with 55° F. air at 490 lbs/hr. The meltblown material was collected on the bare collector belt moving at 45 ft/min with a vacuum pressure of approximately 20 inches of water through a 7 inch wide slot. The free standing nanofiber meltblown had a caliper of less than 0.001", a basis weight of 5 gsm, air permeability of 150 cfm at 0.5" water column.

The meltblown nanofiber was adhered to a corrugated support layer formed from a cellulose fiber containing 20% vinyl acetate resin 80% cellulosic fiber wet laid nonwoven with a basis weight of 114 gsm and an air permeability of 16 cfm at 0.5" water. The corrugated support layer had a corrugation channel width of 0.22". The corrugation depth of the support layer was 0.022" on the felt side to be coated, the opposite (Wire) side had a corrugation depth of 0.022" as measured with the IAS Laser Corrugation Gauge.

The meltblown nanofiber was adhered to the cellulose support by application of a hot melt glue (Bostik M2751 adhesive) heated to 400° F. and sprayed at 410° F. at an areal weight of 6 g/m2 to the cellulose support and then immediately bonding the glue applied layer to the meltblown/nanofiber cellulose by contact pressure between a stainless steel belt used to collect the meltblown fibers and a rubber roller at a nip pressure of 30 pounds per linear inch (PLI). The article was made into a filter element having the meltblown nanofiber facing the inlet and the cellulose support facing the downstream side.

The filter media had a basis weight of 125 gsm, a caliper of 0.029" and an air permeability of 14 cfm at 0.5" water column. The NaCl particle filtration efficiency was 63%. This is an improvement over the uncoated cellulose substrate (approximately 26%). This composite had a corrugation depth of 0.016" on the meltblown nanofiber coated side and 0.018" on the reversed, uncoated (wire) side. The mean peel strength of the nanofiber layer to the base substrate was 2.0 ounces per inch width.

14. Sample N

Sample N was prepared by forming a 5 gsm meltblown web from 0.4 micron polypropylene fibers (Exxon PP3546 G, ExxonMobil Chemical Company, Houston, Tex.) produced from a polymer heated to 450° F. at rate of 20 lbs of polymer/hr from a 35 holes per inch die blown by process air heated to 450° F. at a flow rate of 4360 lbs/hr while quenching with 55° F. air at 490 lbs/hr. The meltblown material was collected on the bare collector belt moving at 45 ft/min with a vacuum pressure of approximately 20 inches of water through a 7 inch wide slot. The free standing nanofiber meltblown had a caliper of less than 0.001", a basis weight of 5 gsm, air permeability of 150 cfm at 0.5" water column.

The meltblown nanofiber was adhered to a corrugated support layer formed from a cellulose fiber containing 20% vinyl acetate resin 80% cellulosic fiber wet laid nonwoven with a basis weight of 122 gsm and an air permeability of 28 cfm at 0.5" water. The corrugated support layer had a corrugation channel width of 0.170". The corrugation depth of the support layer was 0.013" on the felt side to be coated, the opposite (Wire) side had a corrugation depth of 0.013" as measured with the IAS Laser Corrugation Gauge.

The meltblown nanofiber was adhered to the cellulose support by application of a hot melt glue (Bostik M2751 adhesive) heated to 400° F. and sprayed at 410° F. at an areal weight of 6 g/m2 to the cellulose support and then immediately bonding the glue applied layer to the meltblown/nanofiber cellulose by contact pressure between a stainless steel belt used to collect the meltblown fibers and a rubber roller at a nip pressure of 30 pounds per linear inch (PLI). The resulting article was made into a filter having the meltblown nanofiber facing the inlet and the cellulose support facing the downstream side.

The filter media had a basis weight of 134 gsm, a caliper of 0.021" and an air permeability of 24 cfm at 0.5" water column. The NaCl particle filtration efficiency was 62%. This is an improvement over the uncoated cellulose substrate (approximately 20%). This composite had a corrugation depth of 0.08" on the meltblown nanofiber coated side and 0.011" on the reversed, uncoated (wire) side. The mean peel strength of the nanofiber layer to the base substrate was 2 ounces per inch width

15. Sample O

Sample O was prepared by forming a 25 gsm meltblown web from 0.6 micron PBT fibers (Ticona JKX) produced from a polymer heated to 550° F. at rate of 80 lbs of polymer/hr from a 35 holes per inch die blown by process air heated to 575° F. at a flow rate of 2500 lbs/hr. The meltblown material was collected on the bare collector belt moving at 40 ft/min with a vacuum pressure of approximately 20 inches of water through a 7 inch wide slot.

The meltblown nanofiber was adhered to a support layer formed from a cellulose fiber containing 20% phenolic resin and 80% cellulosic fiber wet laid nonwoven with a basis weight of 200 gsm and an air permeability of 2 cfm at 0.5" water. Overall thickness was 0.029" and corrugation depth was 0.013".

The meltblown nanofiber was adhered to the cellulose support by application of a hot melt glue (Bostik Vitel 4361B adhesive) heated to 450° F. and sprayed at 450° F. at an areal weight of 8 g/m2 to the cellulose support and then immediately bonding the glue applied layer to the meltblown/nanofiber cellulose by contact pressure between a stainless steel belt used to collect the meltblown fibers and a rubber roller at a nip pressure of 35 pounds per linear inch (PLI). The resulting structure was made into a filter media having the meltblown nanofiber facing the inlet and the cellulose support facing the downstream side.

The filter media had a basis weight of 233 gsm, a overall caliper of 0.024" and an air permeability of 1.9 cfm at 0.5" water column. This composite had a corrugation depth of 0.06" on the meltblown nanofiber coated side and 0.010" on the reversed, uncoated (wire) side. The mean peel strength of the nanofiber layer to the base substrate was 3.5 ounces per inch width.

16. Comparison Example

The comparison example 1 was prepared by forming a 5 gsm meltblown web from 0.7 micron polypropylene fibers (Exxon PP3546 G, ExxonMobil Chemical Company, Houston, Tex.) produced from a polymer heated to 425° F. at rate of 20 lbs of polymer/hr from a 35 holes per inch die blown by process air heated to 435° F. at a flow rate of 3900 lbs/hr while quenching with 55 F air at 520 lbs/hr. The meltblown material was collected on the bare collector belt moving at 60 ft/min with a vacuum pressure of approximately 20 inches of water through a 7 inch wide slot. The free standing nanofiber meltblown had a caliper of less than 0.001", a basis weight of 5 gsm, air permeability of 172 cfm at 0.5" water column.

The meltblown nanofiber was adhered to a corrugated support layer formed from a cellulose fiber containing 17% vinyl acetate resin and 83% cellulosic fiber wet laid nonwoven with a basis weight of 125 gsm and an air permeability of 32 cfm at 0.5" water. The corrugated support layer had a corrugation channel width of 0.170". The corrugation depth of the corrugated support layer was 0.015" on the felt side to be coated, the opposite (Wire) side had a corrugation depth of 0.015" as measured with the IAS Laser Corrugation Gauge.

The meltblown nanofiber was adhered to the cellulose support by application of a hot melt glue (Bostik 4379 PVA copolymer adhesive) spray at an areal weight of 3 g/m$^2$ to the cellulose support and then immediately bonding the glue applied layer to the meltblown/nanofiber cellulose by contact pressure between a belt used to collect the meltblown fibers and a rubber roller. The resulting article was made into a filter having the meltblown nanofiber facing the inlet and the cellulose support facing the downstream side.

The filter media had a basis weight of 134 gsm, a caliper of 0.027" and an air permeability of 27 cfm at 0.5" water column. The NaCl particle filtration efficiency was 50%. This is an improvement over the uncoated cellulose substrate (approximately 20%). This composite had a corrugation depth of less than 0.001" on the meltblown nanofiber coated side and 0.015" on the reversed, uncoated (wire) side. This media was used to construct an element with a pleat height of 1.13", element height of 14.375" and pleat count of 155 on a 3" center tube (16.5 pleats per inch center tube ID). The dust holding capacity was reduced by 25% at a face velocity of 300 cfm per SAE J726 protocol in comparison to conventional media. Examining the filters and pleat packs it was found that the unbonded meltblown Nanofiber was blocking the filter inlets formed by the pleating knuckles adding air resistance.

This media was also used in a element with a pleat height of 0.88", element height of 3.125" and a pleat count of 200 around a 10" tube (6.4 pleats per inch center tube ID). The element was tested per SAE J726 protocol using a face velocity of 65 cfm. With this less dense pleated construction (~6 pleats/in vs. 17 pleats/in), dust holding capacity was 11% higher than conventional media.

Examples L-O demonstrated that using the method disclosed herein results in a corrugated filter medium having superior corrugation properties, such as corrugation depth.

C. Discussion

The following discussion provides some general observations based on relevant data. The fiber diameters of 100 fibers at 1000× were measured using scanning electron microscopy (SEM). The fiber diameter was calculated (D, Log D, RMS D, D2/D) along with the geometric standard deviation to determine the distribution of fiber diameters. The average (log D) fiber diameters were used as a reference to characterization the different samples. The meltblown nanofibers were considerably finer than normal meltblown fibers, approaching that of electrospun, but with a significantly broader distribution (~2 GSTD meltblown nanofibers vs. <1.3 for Electrospun nanofibers).

The meltblown nanofibers were considerably finer, but not as fine as the electrospun Nanofibers.

Looking at the cross-sectional areas, the meltblown nanofiber was shown to be quite different from the electrospun nanofiber. The electrospun nanofiber had a nanofiber layer thickness of one micron to four microns, whereas the meltblown nanofiber had a nanofiber layer thickness of 17 microns to 30 microns.

For industrial cleaning applications, application of meltblown nanofibers can allow the use of a more open base material (Samples B and E), which would lower restriction and extend useful filter life, while maintaining and slightly increasing efficiency of dust capture. Filter life of meltblown nanofiber coated media offers a substantial increase in operating time when compared to standard cellulose application grade (H&V FA6176).

Samples E, F and G had greater dust holding capacity than the standard application base material (approximately 16% to 40% improvement over standard application grade material). It is notable that in the comparison of Samples F and G that Sample G had a lower applied weight of meltblown nanofiber and also less dust holding capacity, suggesting that the quantity of meltblown nanofibers plays a role in the total dust holding capacity of the composite.

The meltblown fibers seemed to create a better, more homogenous dust cake, and the dust cake itself was easier to remove with pulsing giving a unique form of surface and depth filtration. With an open, low density, meltblown structure with some depth (Samples B, D and E), dust was formed in open funnels that are easily removed. In comparison to electrospun nanofiber, which only has surface filtration characteristics, the cleanable dust capacity might be more limited. For standard application grade cellulose media, the pressure rise from the aging was prohibitively high and therefore can be interpreted as having practically no cleanability behavior after aging. Meltblown nanofiber coatings of Sample B, D and E have shown very good retention of cleanability behavior after ageing (more than 70% of initial).

It was clear that fine particle capture efficiency was greatly improved by the presence of the meltblown nanofibers, as was also true for the electrospun nanofibers over the standard application grade cellulose. The meltblown nanofiber had the unique property of added particle capacity which lessens the pressure rise across the filter with accumulation of fine particles and nearly doubles filter life in comparison to standard application grade cellulose. It is believed that electrospun nanofiber actually would decrease filter life due to collection of fine particles at the outermost surface when the nanofiber is applied upstream and at the cellulose/nanofiber interface when the nanofiber layer is positioned downstream, greatly increasing pressure drop. In the case of the meltblown nanofiber composite, the particles were collected also in the meltblown layer increasing fine particle capture capacity.

The same observations for the heavy duty air grades can be made as for the Auto Air grades. Differences in particle capture efficiency for the heavy duty air grades between the nanofiber coated grades to the standard application cellulose are less dramatic due its fine pore structure and lower permeability. However, this fine base pore structure becomes clogged with fine particles rapidly resulting in a rapid pressure rise, greatly limiting useful operating life. The application of meltblown nanofibers through improved particle collection greatly extends operating life by over 300%.

The capacity of the meltblown nanofiber grades greatly exceeded that of the standard application cellulose and the electrospun nanofiber coated.

It should be noted that a second standard application cellulose was compared to sample B due to the coating orientation of the cellulose base sheet being on the more open side (felt), whereas for auto air the coating would normally be on the wire side. Challenging the wire side (which has a finer pore structure) of any cellulose media with a dust stream will reduce capacity due to the presence of fine pores. Under these conditions, the meltblown nanofiber has a diminished effect on the fine particle capacity of the composite media.

According to the liquid filtration efficiency test, the nanofiber coated cellulose greatly improved filtration performance for cellulose media, whereas electrospun nanofiber gives only a temporary improvement in performance and relatively quickly loses its advantage due to degradation of the fine fiber structure. Particle capture efficiency at particle sizes of four microns and 10 microns are improved by the addition of meltblown nanofibers over conventional cellulose media. At a particle size of 25 microns, particle capture efficiency was not improved by the addition of meltblown nanofibers. The size particles that can be captured at 90% efficiency and 99% efficiency, respectively, is considerably finer for Sample J (5.5 microns and 8.1 microns, respectively) compared to cellulose (11.1 microns and 17.9 microns, respectively). The size particles that can be captured at 90% efficiency and 99% efficiency, respectively, is also considerably finer for Sample J (5.5 microns and 8.1 microns, respectively) compared to electrospun fiber (9.8 microns and 14.6 microns, respectively).

While certain embodiments have been described, other embodiments are possible.

As an example, while embodiments have been described in which a scrim is disposed between a substrate and a meltblown layer, in certain embodiments, the meltblown layer can be between the substrate and the scrim.

As another example, while embodiments have been described in which a filter medium includes three layers, a filter medium can optionally include more layers. In some embodiments, a filter medium may have more than one substrate, more than one intermediate layer (e.g., more than one adhesive, more than one scrim), and/or more than one meltblown layer. As an example, in some embodiments, a filter medium can include a meltblown layer with fibers having an average fiber diameter and a second meltblown layer with fibers having a different average fiber diameter. A filter medium can also include additional layers.

As a further example, while embodiments have been described in which a filter medium has one meltblown layer, a filter medium can optionally include more than one meltblown layer. In certain embodiments, a filter medium can include a meltblown layer disposed on a meltblown layer.

As an additional example, while certain methods have been described for making a filter medium, other methods may also be used. As an example, in some embodiments, the substrate can be formed of a bicomponent film (e.g., a relatively low melting point material and a relatively high melting point material), onto which the meltblown material is formed. Subsequently, the relatively low melting point material is heated to melt the material (e.g., via the heat from the meltblown material and/or via heating in an oven), followed by cooling (e.g., to room temperature) to provide a filter medium that includes the meltblown material directly bonded to the substrate. As another example, in some embodiments, the substrate can be formed of two layers with one layer being formed of the relatively low melting point material and the other layer being formed of the relatively high melting point material. In such embodiments, the meltblown material can be deposited on the relatively low melting point material. Subsequently, the relatively low melting point material is heated to melt the material (e.g., via the heat from the meltblown material and/or via heating in an oven), and cooling (e.g., to room temperature) provides a filter medium that includes the meltblown material directly bonded to the substrate. The materials (relatively low melting point material, relatively high melting point material) from which the substrate is formed can be any desired material with the appropriate melting characteristics. Typically, such materials are polymers. In some embodiments, the relatively low melting point material can be one of the adhesives described above (e.g., the substrate can be a film formed of a composite that includes the adhesive). Optionally, a scrim and/or additional other layers of material can be incorporated into the filter medium. In certain embodiments, the substrate can include one or more additional materials.

As a further example, while embodiments have been described in which a meltblown material is bonded with a substrate via chemical bonding using an adhesive or mechanical bonding using ultrasonic bonding or melting/cooling, in some embodiments, other types of mechanical bonding can be used. Examples include stitching, sewing, hydroentangling and needling. In some methods, such as needling and hydroentangling, the meltblown material can become intermingled with another layer (e.g., the substrate).

As yet another example, while embodiments have been described in which meltblown material is used, additionally or alternatively, other materials can be used. More generally, without limitation to the material used or the process of forming the fibers, a material with fibers having an average diameter at most 1.5 microns (e.g., at most 1.4 microns, at most 1.3 microns, at most 1.2 microns, at most 1.1 microns, at most one micron), and/or at least 0.2 micron (e.g., at least 0.3 micron, at least 0.4 micron, at least 0.5 micron), as measured using scanning electron microscopy, can be used in what is described above as the meltblown layer. In some embodiments, the material is formed using melt processing (e.g., a meltblown process, spun bond, extrusion and blown film extrusion). In some embodiments, the small average diameter material can be formed by other methods. As an example, the small average diameter material can be made by taking a fiber of a relatively large diameter and stretching it to form the small average diameter material. Other methods include the "islands in the sea" and "segmented pie" methods of forming fibers, such as described in U.S. Pat. Nos. 5,783,503; 5,935,883; and 6,858,057, which are hereby incorporated by reference only to the extent that they are consistent with the remainder of the disclosure herein. In some embodiments, the material is non-polymeric (e.g., a glass, a ceramic). For example, the material can be a wet laid glass. In some embodiments, the substrate can be formed of a wetlaid glass with a relatively large average diameter (e.g., at most two microns, at most three microns, three microns to four microns), and, rather than a meltblown layer, the filter can include a layer of wetlaid glass fiber with a relatively small average diameter (e.g., at most 1.5 microns), where the filter medium may or may not include an adhesive material.

As a further example, although embodiments have been described in which the filter medium is corrugated and/or pleated, more generally, the filter medium can be shaped in any of a variety of desirable fashions. Such shapes are generally know in the art. Examples of shapes include dimpled, fluted, embossed and glue bead separated, bag structure or tubular structure.

Other embodiments are in the claims.

What is claimed is:

1. A filter medium, comprising:
   a first layer;
   a second layer comprising a meltblown material; and
   an adhesive material between the first and second layers,
   wherein the adhesive layer is constructed and arranged to adhere the first layer to the second layer and to permit fluid to pass through the adhesive layer,
   wherein the filter medium has:
      an initial dust capture efficiency of at least 80% and a dust holding capacity of at least 50 g/m$^2$, wherein the initial dust capture efficiency and the dust holding capacity are measured by taking a 100 cm$^2$ surface area of the filter medium and challenging the medium with a fine dust (0.1-80 μm) at a concentration of 200 mg/m$^3$ and a face velocity of 20 cm/s, wherein the initial dust capture efficiency is measured after one minute and the dust holding capacity is measured when the pressure reaches 1800 Pa; and
      an initial cleanability test time and an aged cleanability test time, the aged cleanability test time being at least 70% of the initial cleanability test time,
   wherein the initial cleanability test time is the amount of time it takes to complete 30 test cycles and the aged cleanability test time is the amount of time it takes to complete 30 test cycles after aging the filter medium,
   wherein each test cycle comprises sending AC fine dust at 16 g/hr through the filter medium at a test area of 177 cm$^2$, a face velocity of 5 cm/s, and when the filter medium reaches a pressure of 10 mBar subjecting the filter medium to a 150 millisecond pulse at 4 bar to remove AC fine dust from the filter medium,
   wherein aging comprises continuously exposing the filter medium to AC fine dust at 12 g/hr for 10,000 aging cycles and subjecting the filter medium to a 150 millisecond pulse at 4 bar 14 times per minute, wherein the aging cycles are defined between consecutive pulses.

2. A filter medium according to claim 1, wherein the article has a NaCl particle filtration efficiency of at least 30%.

3. A filter medium according to claim 1, wherein the article has a periodic dust capture efficiency of at least 80%, and a dust holding capacity of at least 50 g/m$^2$.

4. A filter medium according to claim 1, wherein the article has an initial cleanability test time of at least four hours.

5. A filter medium according to claim 1, wherein the article has a soot particle capture efficiency of at least 80%.

6. A filter medium according to claim 1, wherein the article has a NaCl particle filtration of at least 30% and a NaCl particle capture test time of at least 40 minutes.

7. A filter medium according to claim 1, wherein the article has a liquid filtration efficiency of at least 45%.

8. A filter medium according to claim 1,
wherein the first layer has first and second sides; and
the adhesive material is between the first side of the first layer and the second layer,
wherein the filter medium is a corrugated filter medium having a retained corrugation of at least 25%.

9. The filter medium of claim 8, wherein the filter medium has a corrugation depth of at least 14 mils on the first side of the first layer.

10. The filter medium of claim 8, wherein the filter medium has a corrugation depth of at most 25 mils on the first side of the first layer.

11. The filter medium of claim 8, wherein the filter medium has a corrugation depth of at least 14 mils on the second side of the first layer.

12. The filter medium of claim 8, wherein the filter medium has a corrugation depth of at most 25 mils on the second side of the first layer.

13. The filter medium of claim 8, wherein the filter medium has a retained corrugation of at least 30%.

14. The filter medium of claim 8, wherein the filter medium has a retained corrugation of at least 50%.

15. The filter medium of claim 8, wherein the filter medium has a retained corrugation of at least 70%.

16. The filter medium of claim 8, wherein the first layer has a corrugation depth of at least 20 mils on the first and second sides.

17. The filter medium of claim 8, wherein the first layer has a corrugation depth of at least 22 mils on the first and second sides.

18. The filter medium of claim 8, wherein the first layer has a corrugation depth of at most 30 mils on the first and second sides.

19. The filter medium of claim 1, wherein the meltblown material comprises a plurality of fibers having an average diameter of at most 1.5 microns.

20. The filter medium of claim 1, wherein the meltblown material comprises a plurality of fibers having an average diameter of at least 0.2 micron.

21. The filter medium of claim 1, wherein the meltblown material comprises a plurality of discrete fibers, at least 5% of the discrete fibers extending a distance of at least 0.3 micron in a direction perpendicular to a length of the second layer.

22. The filter medium of claim 1, wherein the first layer comprises a material selected from the group consisting of short laid fibers, spunlace fibers, carded non-woven materials, woven cloths and open cell foam structures.

23. The filter medium of claim 1, wherein a thickness of the first layer is at least 200 microns.

24. The filter medium of claim 1, wherein a thickness of the first layer is at most 1500 microns.

25. The filter medium of claim 1, wherein the first layer has a basis weight of at least 25 g/m$^2$.

26. The filter medium of claim 1, wherein the meltblown material comprises a polymer.

27. The filter medium of claim 1, wherein a thickness of the second layer is at least 5 microns.

28. The filter medium of claim 1, wherein a thickness of the second layer is at most 200 microns.

29. The filter medium of claim 1, wherein the second layer has a basis weight of at least 0.5 g/m$^2$.

30. The filter medium of claim 1, wherein the second layer has an air permeability of at most 500 CFM.

31. The filter medium of claim 1, wherein a thickness of the article is at least 200 microns.

32. The filter medium of claim 1, wherein a thickness of the article is at most 1500 microns.

33. The filter medium of claim 1, wherein the article has a basis weight of at most 500 g/m$^2$.

34. The filter medium of claim 1, wherein the article has an air permeability of at most 100 CFM.

35. The filter medium of claim 1, wherein the article has an air permeability of at most 100 CFM.

* * * * *